(12) United States Patent
Bursell et al.

(10) Patent No.: US 11,451,380 B2
(45) Date of Patent: Sep. 20, 2022

(54) MESSAGE DECRYPTION DEPENDENT ON THIRD-PARTY CONFIRMATION OF A CONDITION PRECEDENT

(71) Applicant: Red Hat, Inc., Raleigh, NC (US)

(72) Inventors: Michael H. M. Bursell, Farnborough (GB); Nathaniel P. McCallum, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 271 days.

(21) Appl. No.: 16/510,453

(22) Filed: Jul. 12, 2019

(65) Prior Publication Data
US 2021/0014044 A1   Jan. 14, 2021

(51) Int. Cl.
*H04L 9/08* (2006.01)
*H04L 9/14* (2006.01)

(52) U.S. Cl.
CPC .......... *H04L 9/083* (2013.01); *H04L 9/0825* (2013.01); *H04L 9/0866* (2013.01); *H04L 9/14* (2013.01)

(58) Field of Classification Search
CPC ..... H04L 9/083; H04L 9/0825; H04L 9/0866; H04L 9/14
See application file for complete search history.

(56) References Cited

U.S. PATENT DOCUMENTS 10,026,118 B2   7/2018  Castinado et al.
10,601,585 B1 *  3/2020  Robinson ................ H04L 9/085
2002/0112171 A1  8/2002  Ginter et al.
2012/0259759 A1 10/2012  Crist et al.
2013/0121490 A1 * 5/2013  Boliek ................... H04L 9/0825
                                                            380/255
2013/0232339 A1  9/2013  Ignatchenko et al.
2015/0256336 A1  9/2015  Stiglic et al.
2017/0085545 A1  3/2017  Lohe et al.
(Continued)

FOREIGN PATENT DOCUMENTS

CN   107070856 A  *  8/2017  ........... H04L 63/045
WO   2016063092 A1   4/2016
(Continued)

OTHER PUBLICATIONS

Author Unknown, "Oraclize Documentation," docs.oraclize.it/#home, accessed on Jul. 26, 2018, 29 pages.
(Continued)

*Primary Examiner* — Mohammed Waliullah
(74) *Attorney, Agent, or Firm* — Dority & Manning, P.A.

(57) ABSTRACT

Message decryption dependent on third-party confirmation of a condition precedent is disclosed. A message is encrypted with a message encryption key to form an encrypted message. A message decryption key that is configured to decrypt the encrypted message is encrypted with a key of a first entity to which the message is to be disclosed upon occurrence of a condition precedent to form an encrypted message decryption key. The encrypted message decryption key is encrypted with a key of a second entity configured to confirm the occurrence of the condition precedent to form a double encrypted message decryption key. A condition identifier that identifies the condition precedent is generated. The encrypted message, the double encrypted message decryption key, and the condition identifier are sent to the first entity.

20 Claims, 16 Drawing Sheets

(56) References Cited

U.S. PATENT DOCUMENTS

| | | |
|---|---|---|
| 2017/0287068 A1 | 10/2017 | Nugent |
| 2018/0089758 A1 | 3/2018 | Stradling et al. |
| 2018/0094953 A1 | 4/2018 | Colson et al. |
| 2018/0097783 A1 | 4/2018 | Haldenby et al. |
| 2018/0123804 A1 | 5/2018 | Smith et al. |
| 2018/0191503 A1 | 7/2018 | Alwar et al. |
| 2018/0218176 A1 | 8/2018 | Voorhees et al. |
| 2018/0227118 A1 | 8/2018 | Bibera et al. |
| 2019/0035014 A1 | 1/2019 | Bell et al. |
| 2019/0114706 A1 | 4/2019 | Bell et al. |
| 2019/0158275 A1 | 5/2019 | Beck |
| 2019/0220831 A1 | 7/2019 | Rangarajan et al. |
| 2020/0059454 A1 | 2/2020 | Yang et al. |
| 2020/0143337 A1 | 5/2020 | Conroy et al. |
| 2020/0162252 A1* | 5/2020 | Davis ............... H04L 9/088 |
| 2020/0175590 A1 | 6/2020 | Huo |
| 2020/0374272 A1 | 11/2020 | Zhang et al. |
| 2020/0396079 A1 | 12/2020 | Dekant et al. |
| 2020/0401734 A1* | 12/2020 | Murdoch ........... H04L 9/0866 |
| 2021/0035090 A1 | 2/2021 | Iannaccone |
| 2021/0194890 A1 | 6/2021 | Mohalik et al. |

FOREIGN PATENT DOCUMENTS

| | | |
|---|---|---|
| WO | 2017127620 A1 | 7/2017 |
| WO | 2018058105 A1 | 3/2018 |
| WO | 2018224431 A1 | 12/2018 |

OTHER PUBLICATIONS

Author Unknown, "Is it possible to make a contract with an encrypted payload," Reddit thread, reddit.com/r/ethereum/comments/4kd77q/is_it_possible_to_make_a_contract_with_an/, accessed on Aug. 1, 2018, 4 pages.

Author Unknown, "Encrypted Queries: Private Data on a Public Blockchain," blog.oraclize.it/encrypted-queries-private-data-on-a-public-blockchain-71d893fac2bf, accessed on Jul. 26, 2018, 8 pages.

Bertani, Thomas, "Understanding oracles," Oraclize, blog.oraclize.it/understanding-oracles-99055c9c9f7b, Feb. 18, 2016, 5 pages.

Cardoso, Jose, "Blockchain and Smart Contracts for the Internet of Things—an Architecture for Sensor Data Availability," LISBOA 2018, 90 pages.

Curran, Brian, "What are Oracles? Smart Contracts, Chainlink & 'The Oracle Problem'," Sep. 19, 2018, blockonomi.com/oracles-guide/, Kooc Media Ltd., 13 pages.

Hertig, Alyssa, "How Ethereum Works," www.coindesk.com/information/how-ethereum-works, accessed Dec. 7, 2018, 5 pages.

Lin, Connor, et al., "A Price-Stable Cryptocurrency for Next-Generation Payments," Carbon, Version 1.0.0, Apr. 3, 2018, 21 pages.

Linder, Peter, "Decryption Contract Enforcement Tool (Decent): A Practical Alternative to Government Decryption Backdoors," Technology Brief, Version 1.0, Mar. 31, 2016, IACR, 20 pages.

Mik, Eliza, "Smart contracts: Terminology, technical limitations and real world complexity," Law, Innovation and Technology, vol. 9, Issue 2, Oct. 2017, Research Collection School of Law, 27 pages.

Shrier, Allison, et al., "Blockchain and Health IT: Algorithms, Privacy, and Data," White Paper, Aug. 8, 2016, 166 pages.

Zhang, Fan, et al., "Town Crier: An Authenticated Data Feed for Smart Contracts," ACM Conference on Computer and Communications Security, Oct. 2016, Vienna, Austria, ACM, 20 pages.

Ellis, S. et al., "ChainLink: A Decentralized Oracle Network," V1.0, Sep. 4, 2017, 38 pages.

Non-Final Office Action for U.S. Appl. No. 16/252,008, dated Feb. 3, 2021, 29 pages.

Non-Final Office Action for U.S. Appl. No. 16/252,008, dated Jul. 29, 2021, 33 pages.

Non-Final Office Action for U.S. Appl. No. 16/252,068, dated Mar. 2, 2021, 25 pages.

Notice of Allowance for U.S. Appl. No. 16/252,068, dated Jul. 21, 2021, 10 pages.

Non-Final Office Action for U.S. Appl. No. 16/282,052, dated Apr. 1, 2021, 16 pages.

Non-Final Office Action for U.S. Appl. No. 16/252,008, dated Jan. 24, 2022, 26 pages.

Notice of Allowance for U.S. Appl. No. 16/282,052, dated Dec. 21, 2021, 9 pages.

Final Office Action for U.S. Appl. No. 16/252,008, dated Jul. 12, 2022, 33 pages.

\* cited by examiner

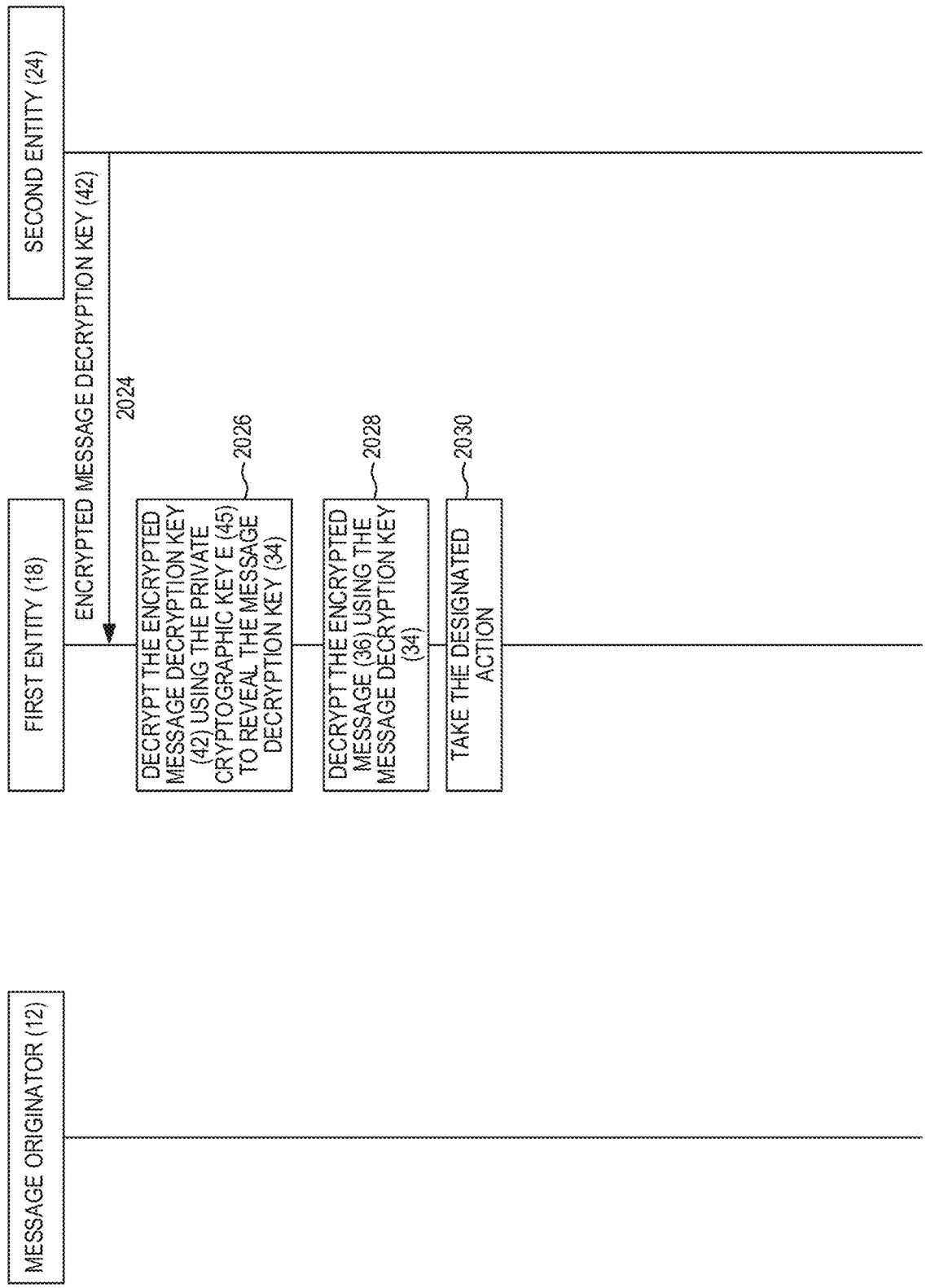

MESSAGE DECRYPTION DEPENDENT ON THIRD-PARTY CONFIRMATION OF A CONDITION PRECEDENT

BACKGROUND

There are situations when an entity is to take action upon the occurrence of one or more conditions precedent, but the action requires access to confidential information that should not be disclosed to the entity unless and until the one or more conditions precedent occur.

SUMMARY

The examples implement message decryption dependent on third-party confirmation of a condition precedent. The examples facilitate the secure transmission of an encrypted message to a first entity that can only access the message upon confirmation by a second entity that a condition precedent has occurred. If the second entity confirms the occurrence of the condition precedent, the second entity can decrypt a double encrypted message key with a key of the second entity to give the first entity access to an encrypted message key. The first entity can then utilize a key of the first entity to decrypt the message key. The first entity can utilize the message key to decrypt the encrypted message and perform the desired action.

In one example a method is provided. A message is encrypted with a message encryption key to form an encrypted message. A message decryption key that is configured to decrypt the encrypted message is encrypted with a key of a first entity to which the message is to be disclosed upon occurrence of a condition precedent to form an encrypted message decryption key. The encrypted message decryption key is encrypted with a key of a second entity configured to confirm the occurrence of the condition precedent to form a double encrypted message decryption key. A condition identifier that identifies the condition precedent is generated, and the encrypted message, the double encrypted message decryption key, and the condition identifier are sent to the first entity.

In another example a computing device is provided. The computing device includes a memory and a processor device coupled to the memory. The processor device is to encrypt a message with a message encryption key to form an encrypted message. The processor device is further to encrypt a message decryption key that is configured to decrypt the encrypted message with a key of a first entity to which the message is to be disclosed upon occurrence of a condition precedent to form an encrypted message decryption key. The processor device is further to encrypt the encrypted message decryption key with a key of a second entity configured to confirm the occurrence of the condition precedent to form a double encrypted message decryption key. The processor device is further to generate a condition identifier that identifies the condition precedent, and send the encrypted message, the double encrypted message decryption key, and the condition identifier to the first entity.

In another example a computer program product is provided. The computer program product is stored on a non-transitory computer-readable storage medium and includes instructions to cause a processor device to encrypt a message with a message encryption key to form an encrypted message. The instructions further cause the processor device to encrypt a message decryption key that is configured to decrypt the encrypted message with a key of a first entity to which the message is to be disclosed upon occurrence of a condition precedent to form an encrypted message decryption key. The instructions further cause the processor device to encrypt the encrypted message decryption key with a key of a second entity configured to confirm the occurrence of the condition precedent to form a double encrypted message decryption key. The instructions further cause the processor device to generate a condition identifier that identifies the condition precedent, and send the encrypted message, the double encrypted message decryption key, and the condition identifier to the first entity.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 3A-3C are message flow diagrams illustrating communication flows among the elements of the computing system of FIG. 1 for message decryption dependent on third-party confirmation of a condition precedent according to one example;

DETAILED DESCRIPTION

Figure 1:
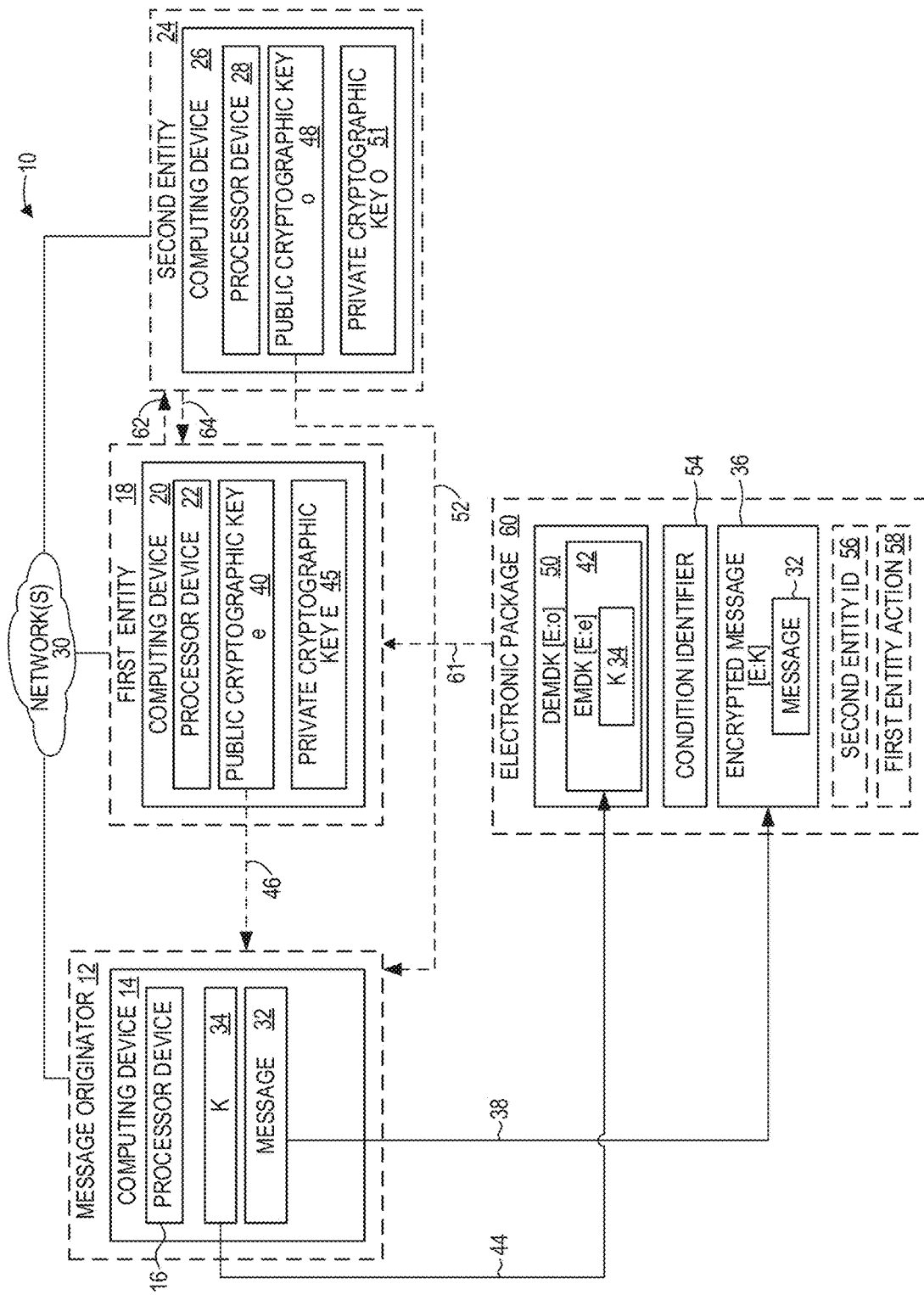
FIG. 1 is a block diagram of a computing system for message decryption dependent on third-party confirmation of a condition precedent according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first condition" and "second condition," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

There are situations when an entity is to take action upon the occurrence of one or more conditions precedent, but the action requires access to confidential information that should not be disclosed to the entity unless and until the one or more conditions precedent occur. As an example, a testator may wish, upon her death, that the executor of the estate transfer the proceeds of a bank account to a charity. In order to gain access to the bank account, authentication information, such as a user identifier and password, are needed. However, the testator does not want to provide the executor access to the authentication information until the testator has died, and the probate court has approved the final estate accounting, simply because the fewer entities that know the authentication information the less likely that the account can be accessed by a malicious entity.

The examples implement message decryption dependent on third-party confirmation of a condition, or conditions, precedent. The examples facilitate the secure transmission of an encrypted message to a first entity that can only access the message upon confirmation by a second entity that a condition precedent has occurred. If the second entity confirms the occurrence of the condition precedent, the second entity can decrypt a double encrypted message key with a key of the second entity to give the first entity access to an encrypted message key. The first entity can then utilize a key of the first entity to decrypt the message key. The first entity can utilize the message key to decrypt the encrypted message and perform the desired action.

The examples eliminate any ability of the first entity to whom the encrypted message was sent (as well as any malicious entity that might have intercepted or otherwise gained access to the encrypted message) from accessing the message unless and until the condition(s) precedent has occurred. If the condition precedent never occurs, the message remains encrypted and the information in the encrypted message can never be accessed, and thus will never be disclosed.

FIG. 1 is a block diagram of a computing system 10 suitable for message decryption dependent on third-party confirmation of a condition precedent according to one example. The computing system 10 includes a message originator 12 comprising a computing device 14 that includes a processor device 16; a first entity 18 comprising a computing device 20 that includes a processor device 22; and a second entity 24 comprising a computing device 26 that includes a processor device 28. The second entity 24 may be referred to herein as a "third party." The message originator 12, first entity 18 and the second entity 24 are communicatively coupled with one another via one or more networks 30. In this example, the first entity 18 will, upon confirmation of an occurrence of a condition precedent by the second entity 24, perform an action requested by the message originator 12. The terms "message originator 12," "first entity 18," and "second entity 24" are logical constructs used for purposes of explanation whose actions are implemented by the corresponding computing devices 14, 20, and 26, respectively. Thus, for example, a reference to the message originator 12 is also a reference to the computing device 14. The computing devices 14, 20, and 26 may be associated with users, which may, in some cases, input information into the corresponding computing devices 14, 20, and 26 to cause the computing devices 14, 20, and 26 to take the actions described herein, or the computing devices 14, 20, and 26 may automatically take one or more of the actions described herein without input from a user.

The message originator 12 generates a message 32 that contains sensitive data that is necessary to carry out the action to be performed by the first entity 18 upon satisfaction of the condition precedent. For example, the message 32 may comprise authentication information for authenticating or for authorizing an operation on behalf of a user of the message originator 12, as non-limiting examples. The message 32 may also include instructions that identify the action to be taken by the first entity 18, and/or any other information that the message originator 12 desires that the first entity 18 have possession of upon the occurrence of the condition precedent. In one example, the message originator 12 encrypts the sensitive data with a key 34 ("K") to form an encrypted message 36, as indicated by an arrow 38. Throughout the specification and drawings, references to a "key" refer to cryptographic keys used to encrypt and/or decrypt data. A key may be an encryption key used to encrypt data, a decryption key used to decrypt data, or may operate to both encrypt and decrypt data, such as in the case of a symmetric cryptographic key. For purposes of illustration and clarity, throughout the drawings, data that is encrypted may be denoted in square brackets and the letter "E" followed by a colon ":" and the identity of the encryption key via which the respective data is encrypted. As an example, the encrypted message 36 is indicated as being encrypted with the key 34 ("K") via the designation "[E:K]".

In this example, the key 34 is a symmetric cryptographic key and thus can be used both to generate the encrypted message 36 via an encryption operation and to decrypt the encrypted message 36 via a decryption operation to reveal the message 32. Thus, throughout the specification and drawings, the same symmetric key may be referred to as either a message encryption key or a message decryption key depending on the particular use of the key. The message originator 12 encrypts the key 34 with a public cryptographic key 40 ("e") of the first entity 18 to form an encrypted message decryption key 42 ("EMDK"), as indicated by an arrow 44. The public cryptographic key 40 of the first entity 18 corresponds to a private cryptographic key 45 ("E") of the first entity 18, and, in some examples, may be provided by the first entity 18 to the message originator 12, as indicated by arrow 46. The reference to "public" and "private" keys refers to public-key cryptography, sometimes referred to as asymmetric cryptography, which uses a pair of keys. The pair of keys includes a public key that can be publicly distributed to entities by the key-pair owner, and which such entities can use to encrypt a message that can only be decrypted by the key-pair owner using the corresponding private key of the pair of keys. Thus, in this example, only the first entity 18, the holder of the private cryptographic key 45, is able to decrypt the encrypted message decryption key 42.

The message originator 12 then encrypts the encrypted message decryption key 42 with a public cryptographic key 48 ("o") of the second entity 24 to form a double encrypted message decryption key 50 ("DEMDK"). The public cryptographic key 48 corresponds to a private cryptographic key 51 ("O") of the second entity 24. In some examples, the public cryptographic key 48 may be provided by the second entity 24 to the message originator 12, as indicated by an arrow 52. The message originator 12 generates a condition identifier (ID) 54 that identifies a condition precedent, the occurrence of which is confirmable by the second entity 24. In some examples, the message originator 12 may also digitally authenticate the condition identifier ID 54 using the public cryptographic key 48 of the second entity 24. Because the double encrypted message decryption key 50 was generated using the public cryptographic key 48 of the second entity 24, only the second entity 24, the holder of the private cryptographic key 51, is able to decrypt the double encrypted message decryption key 50 to reveal the encrypted message decryption key 42. In some examples, the message originator 12 may also generate a second entity ID 56 that identifies the second entity 24, and a first entity action 58 that identifies the action that the first entity 18 is to take upon confirmation that the condition precedent identified by the condition ID 54 has been satisfied, particularly if the first entity action 58 is not identified in the message 32 or otherwise communicated to the first entity 18.

The message originator 12 then sends an electronic package 60 comprising the encrypted message 36, the double encrypted message decryption key 50, the condition ID 54, and, optionally, the second entity ID 56 and the first entity action 58 to the first entity 18, as indicated by the arrow 61. Subsequently, the first entity 18 may seek to determine whether the condition precedent identified by the condition ID 54 has occurred. To confirm whether the condition precedent identified by the condition ID 54 has occurred, the first entity 18 transmits the double encrypted message decryption key 50 and the condition ID 54 to the second entity 24, as indicated by arrow 62.

Assume that the second entity 24 confirms that the condition precedent identified by the condition ID 54 has been satisfied. If so, the second entity 24 uses the private cryptographic key 51 to decrypt the double encrypted message decryption key 50 to reveal the encrypted message decryption key 42. The second entity 24 transmits the encrypted message decryption key 42 back to the first entity 18, as indicated by arrow 64. The first entity 18 then decrypts the encrypted message decryption key 42 using the private cryptographic key 45 to reveal the key 34, which, in this example, functions as a message decryption key. Using the message decryption key 34, the first entity 18 decrypts the encrypted message 36 to reveal the message 32, and uses the message 32 to take the requested action.

Figure 2:
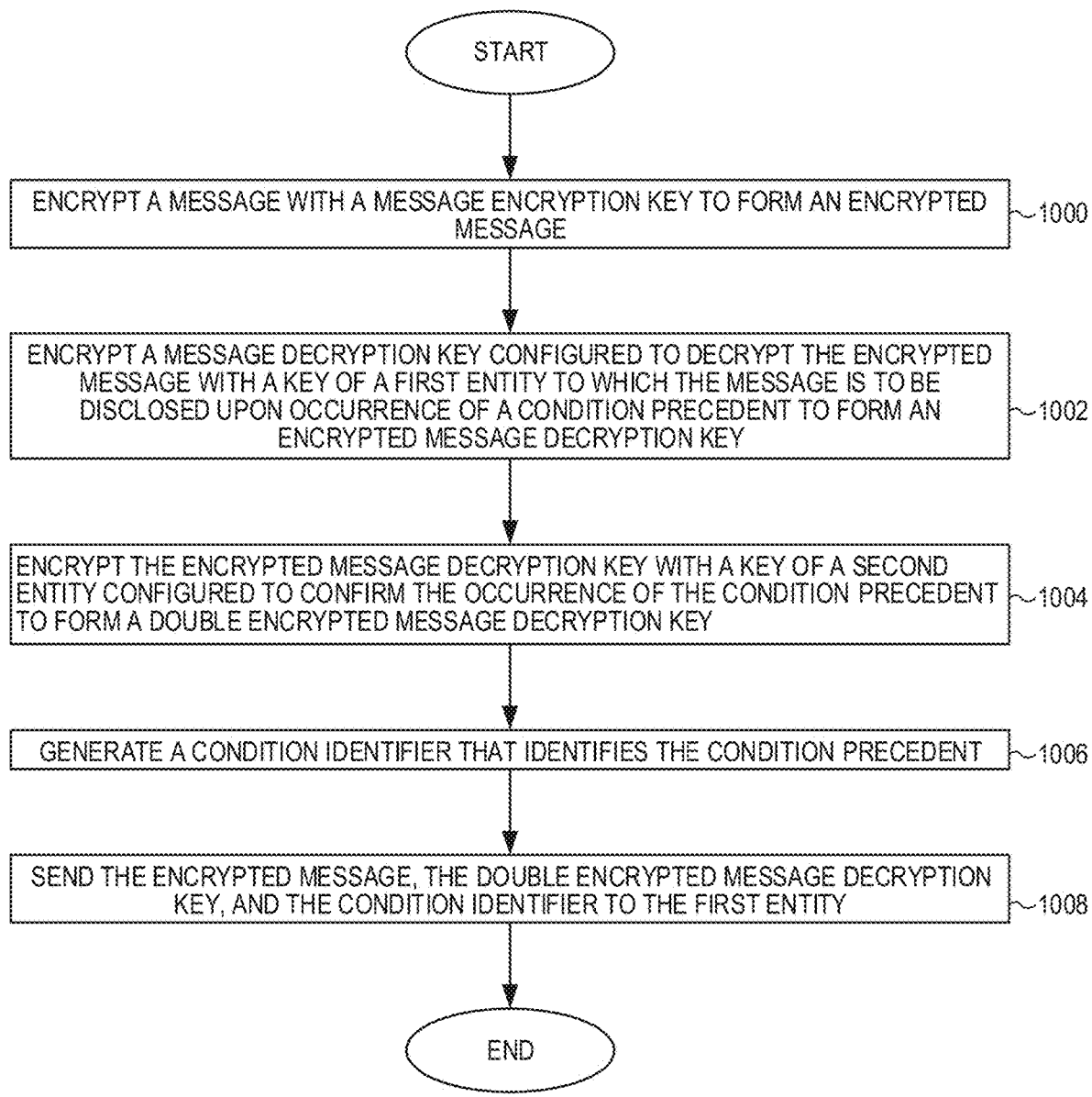
FIG. 2 is a flowchart of a method for message decryption dependent on third-party confirmation of a condition precedent according to one example.

FIG. 2 is flowchart of a method for message decryption dependent on third-party confirmation of a condition precedent according to one example. For purposes of illustration, assume that a testator associated with the message originator 12 decides to leave the balance of a bank account to a charity upon the death of the testator and the approval of the final estate accounting by the probate court. The testator, via the computing device 14, generates the message 32 to contain the authentication information necessary to transfer funds from the bank account. The testator, via the computing device 14, generates the key 34, which, in this example, functions as a symmetric key, being able to both encrypt and decrypt messages. The testator encrypts the message 32 with the message encryption key 34 to form the encrypted message 36 (FIG. 2, block 1000). The testator, via the computing device 14, encrypts the message decryption key 34, which is configured to decrypt the encrypted message 36, with the public cryptographic key 40 of the first entity 18 to whom the message 32 is to be disclosed upon occurrence of the above-identified condition precedent, to form the encrypted message decryption key 42 (FIG. 2, block 1002). In this example, the first entity 18 is associated with the executor of the estate. The testator, via the computing device 14, encrypts the encrypted message decryption key 42 with the public cryptographic key 48 of the second entity 24 that is configured to confirm the occurrence of the condition precedent, to form the double encrypted message decryption key 50 (FIG. 2, block 1004). In this example, the second entity 24 is associated with a legal representative of the testator. The testator, via the computing device 14, then generates the condition ID 54, which in this example identifies the condition precedent that the probate court has approved the final estate accounting. The condition precedent is confirmable by the second entity 24. The testator sends the encrypted message 36, the double encrypted message decryption key 50, and the condition ID 54 to the first entity 18.

At some point in the future, the first entity 18 decides to determine whether the probate court has approved the final estate accounting. This may be done, for example, periodically by the computing device 20 or in response to a request from the executor. The second entity 24 then confirms that the probate court has approved the final estate accounting. For example, the computing device 26 may be able to access electronic records of the probate court to make this determination, or the legal representative may enter data into the computing device 26 that indicates the condition precedent has occurred. The computing device 26 then uses the private cryptographic key 51 to decrypt the double encrypted message decryption key 50 and thereby reveal the encrypted message decryption key 42. The computing device 26 then sends the encrypted message decryption key 42 to the computing device 20. The computing device 20 uses the private cryptographic key 45 to decrypt the encrypted message decryption key 42 and thereby reveal the message decryption key 34. The computing device 20 uses the message decryption key 34 to decrypt the encrypted message 36 to reveal the message 32. Using the message 32, the computing device 20 transfers the balance of the bank account to the designated charity.

Figure 3A:
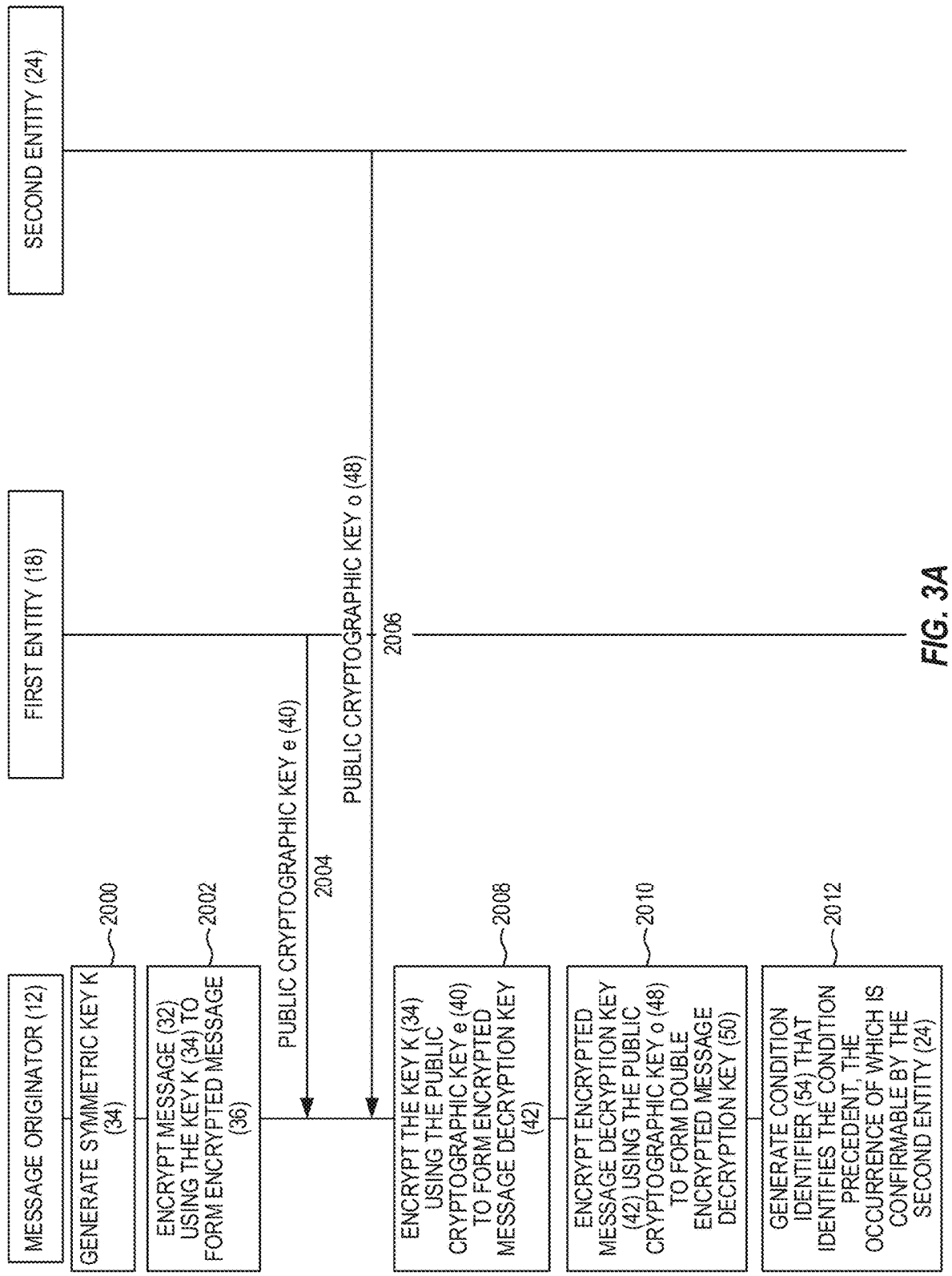
Figure 3B:
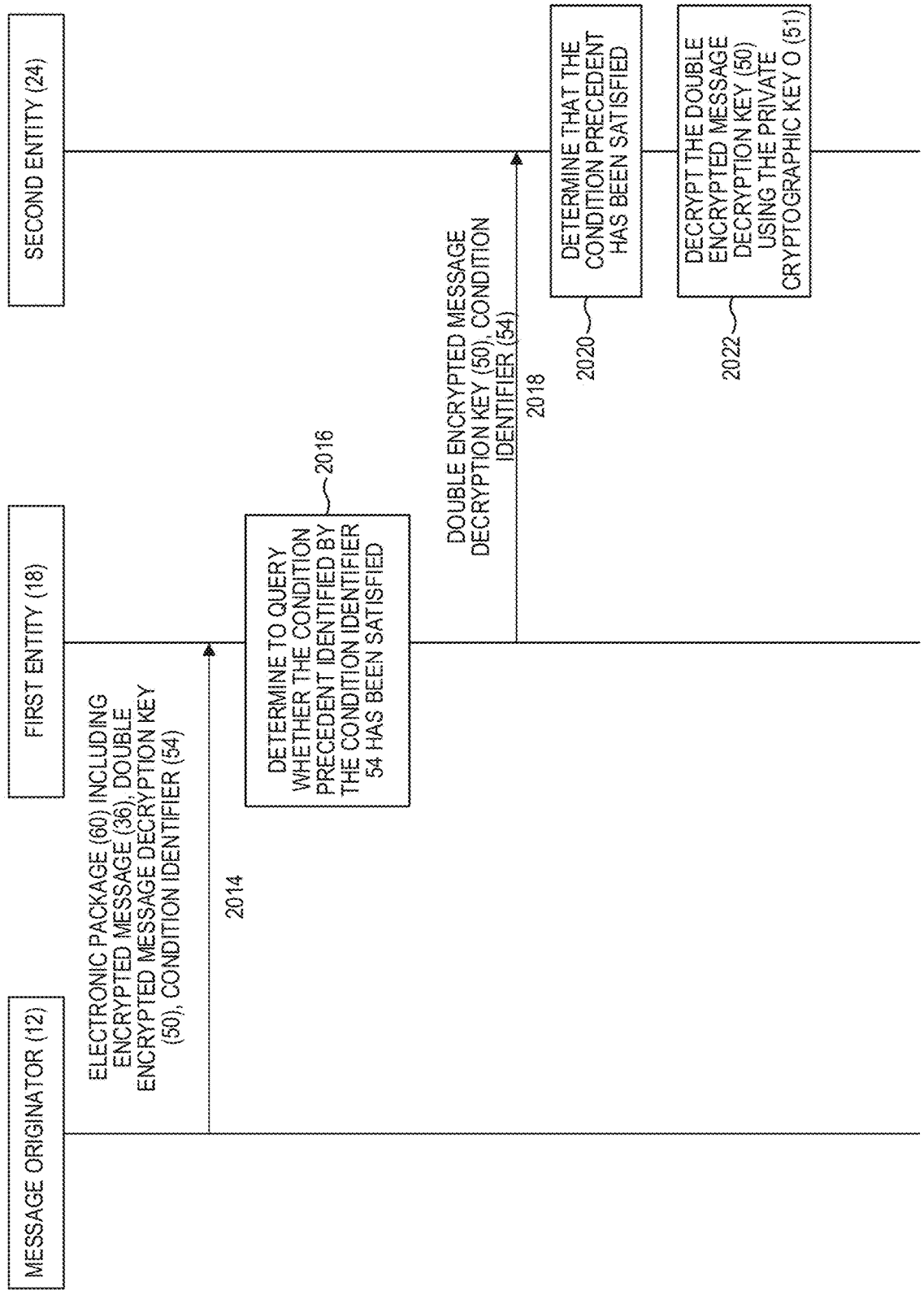

FIGS. 3A-3C are message flow diagrams that illustrate communication flows among the elements of the computing system 10 of FIG. 1 for message decryption dependent on third-party confirmation of a condition precedent. Elements of FIG. 1 are referenced in describing FIGS. 3A-3C for the sake of clarity. As seen in FIGS. 3A-3C, each of the message originator 12, the first entity 18, and the second entity 24 are represented by vertical lines, with communications between these elements illustrated by captioned arrows, and operations performed by each element illustrated by captioned boxes.

In the example of FIG. 3A, operations begin with the message originator 12 generating the symmetric cryptographic key 34, as indicated by box 2000. The message originator 12 generates the message 32 to include the sensitive data that the message originator 12 desires to encrypt, and encrypts the message 32 into the encrypted message 36 using the symmetric cryptographic key 34, as indicated by box 2002. In some examples, the message originator 12 may receive the public cryptographic key 40 from the first entity 18 as indicated by arrow 2004, and may also receive the public cryptographic key 48 from the second entity 24, as indicated by arrow 2006. The message originator 12 then encrypts the symmetric cryptographic key 34 to form the encrypted message decryption key 42 using the public cryptographic key 40 of the first entity 18, as indicated by block 2008. The message originator 12 encrypts the encrypted message decryption key 42 using the public cryptographic key 48 of the second entity 24 to form the double encrypted message decryption key 50, as indicated by block 2010. The message originator 12 generates the condition ID 54 that identifies the condition precedent, the occurrence of which is confirmable by the second entity 24, as indicated by block 2012. Operations then continue in FIG. 3B.

Referring now to FIG. 3B, the message originator 12 then sends the electronic package 60 including the encrypted message 36, the double encrypted message decryption key 50, and the condition ID 54 to the first entity 18, as indicated by arrow 2014. At a later time, the first entity 18 in some examples may determine to query the second entity 24 whether the condition precedent identified by the condition ID 54 has been satisfied, as indicated by box 2016. The first entity 18 transmits the double encrypted message decryption key 50 and the condition ID 54 to the second entity 24, as indicated by arrow 2018. The second entity 24 determines whether the condition precedent identified by the condition ID 54 has been satisfied, as indicated by box 2020. If so, the second entity 24 decrypts the double encrypted message decryption key 50 using the private cryptographic key 51 of the second entity 24 to reveal the encrypted message decryption key 42, as indicated by box 2022. Operations then resume in FIG. 3C.

Turning to FIG. 3C, the second entity 24 transmits the encrypted message decryption key 42 to the first entity 18, as indicated by arrow 2024. The first entity 18 decrypts the encrypted message decryption key 42 using the private cryptographic key 45 to reveal the message decryption key 34, as indicated by box 2026. The first entity 18 decrypts the encrypted message 36 using the message decryption key 34 to reveal the message 32, as indicated by box 2028. The first entity 18 then takes the appropriate action using the message 32, as indicated by box 2030.

Figure 4:
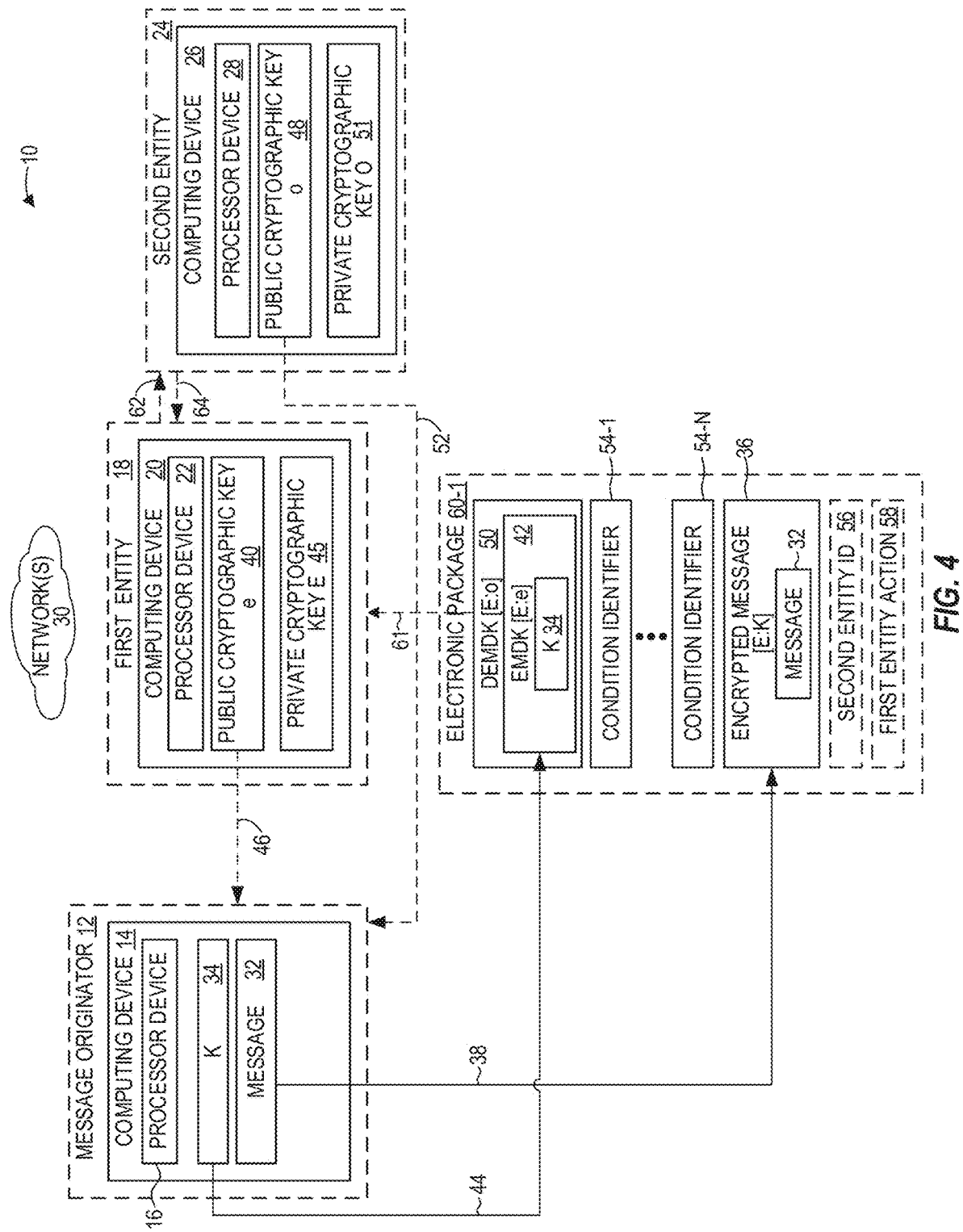
FIG. 4 is a block diagram of the computing system illustrated in FIG. 1 for message decryption dependent on third-party confirmation of a plurality of conditions precedent according to one example.

FIG. 4 is a block diagram of the computing system 10 illustrated in FIG. 1 for message decryption dependent on third-party confirmation of a plurality of conditions precedent according to one example. This example is substantially similar to the example discussed above with regard to FIG. 1, except in this example the first entity 18 is to take an action only after each of a plurality of conditions precedent identified by a plurality of corresponding condition IDs 54-1-54-N have been confirmed by the second entity 24. In particular, the message originator 12 generates the plurality of condition IDs 54-1-54-N, and sends an electronic package 60-1 comprising the encrypted message 36, the double encrypted message decryption key 50, the plurality of condition IDs 54-1-54-N, and, optionally, the second entity ID 56 and the first entity action 58 to the first entity 18. Subsequently, the first entity 18 may seek to determine whether the conditions precedent identified by the condition IDs 54-1-54-N have occurred. To confirm whether the conditions precedent identified by the condition IDs 54-1-54-N have occurred, the first entity 18 transmits the double encrypted message decryption key 50 and the condition IDs 54-1-54-N to the second entity 24. If the second entity 24 determines that not all of the conditions precedent have occurred, the second entity 24 sends a message to this effect to the first entity 18. If the second entity 24 determines that all the conditions precedent identified by the condition IDs 54-1-54-N have been satisfied, the second entity 24 uses the private cryptographic key 51 to decrypt the double encrypted message decryption key 50 to reveal the encrypted message decryption key 42. The second entity 24 transmits the encrypted message decryption key 42 back to the first entity 18. The first entity 18 then decrypts the encrypted message decryption key 42 using the private cryptographic key 45 to reveal the message decryption key 34. Using the message decryption key 34, the first entity 18 decrypts the encrypted message 36 to reveal the message 32, and uses the message 32 to take the requested action.

Figure 5:
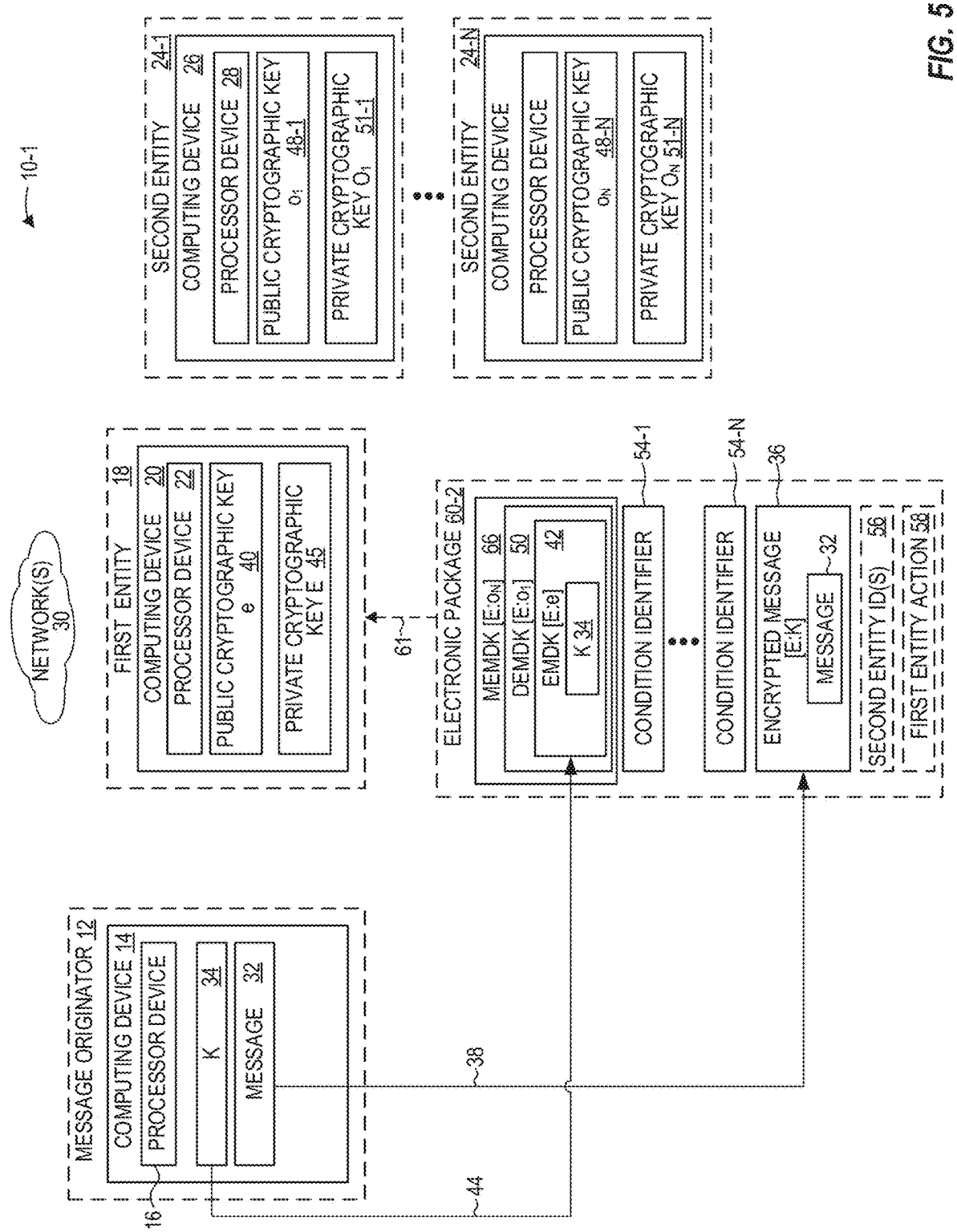
FIG. 5 is a block diagram of a computing system for message decryption dependent on third-party confirmation of a plurality of conditions precedent that are confirmable by a plurality of second entities according to one example.

FIG. 5 is a block diagram of a computing system 10-1 for message decryption dependent on third-party confirmation of a plurality of conditions precedent that are confirmable by a plurality of second entities, according to one example. The computing system 10-1 is substantially similar to and operates in substantially the same manner as the computing system 10 discussed with regard to FIGS. 1-4, except as otherwise discussed below. For clarity and due to limited space in the drawing, some of the arrows indicating communication between elements have been removed; however, the communications between elements is substantially similar to that discussed above with regard to FIG. 1 except as otherwise discussed below. In this example, prior to taking a designated action, the first entity 18 must receive confirmation from a plurality of second entities 24-1-24-N that a plurality of conditions precedent have been satisfied. Each of the second entities 24-1-24-N has a corresponding public cryptographic key 48-1-48-N ("$O_1$-$O_N$"), and a corresponding private cryptographic key 51-1-51-N ("$O_1$-$O_N$"). Note that the plurality of conditions precedent could be different conditions precedent, or one or more could be the same conditions precedent that are to be confirmed by multiple second entities 24.

The message originator 12 forms a multiple encrypted message decryption key 66, by iteratively encrypting the encrypted message decryption key 42 with the public cryptographic key 48-1-48-N of each second entity 24-1-24-N that is configured to confirm the occurrence of the corresponding conditions precedent of the plurality of conditions precedent. As an example, assume that there are two conditions precedent, a first condition precedent confirmable by the second entity 24-1 and a second condition precedent confirmable by the second entity 24-N. The message originator 12 encrypts the encrypted message decryption key 42 with the public cryptographic key 48-1 of the second entity 24-1 to form the double encrypted message decryption key 50.

The message originator 12 then encrypts the double encrypted message decryption key 50 with the public cryptographic key 48-N of the second entity 24-N to form a multiple encrypted message decryption key 66. If there were more than two second entities 24, this process would repeat iteratively for each different second entity 24.

The message originator 12 generates the plurality of condition IDs 54-1-54-N, each of which identifies a corresponding condition precedent. The condition IDs 54-1-54-N may also identify the particular second entity 24-1-24-N that is to confirm the condition precedent. The message originator 12 sends an electronic package 60-2 comprising the encrypted message 36, the multiple encrypted message decryption key 66, the plurality of condition IDs 54-1-54-N, and, optionally, a plurality of second entity IDs 56 and the first entity action 58 to the first entity 18. Subsequently, the first entity 18 may seek to determine whether the conditions precedent identified by the condition IDs 54-1-54-N have occurred.

The multiple encrypted message decryption key 66 is decrypted in reverse order of the order in which the multiple encrypted message decryption key 66 was encrypted. This order may be communicated to the second entity 24 in any desired way, such as, by way of non-limiting example, via the order in which the condition IDs 54-1-54-N are arranged in the electronic package 60-2, or the order may be identified as part of the content of the condition IDs 54-1-54-N. To confirm whether the conditions precedent identified by the condition IDs 54-1-54-N have occurred, the first entity 18 transmits successively, in reverse order, the multiple encrypted message decryption key 66 and the corresponding condition ID 54 to each of the second entities 24-1-28-N. The first entity 18 only sends the multiple encrypted message decryption key 66 and the corresponding condition ID 54 to a next second entity 24 in the series of second entities 24 when the immediately preceding second entity 24 has confirmed the occurrence of the corresponding condition precedence, and has decrypted the multiple encrypted message decryption key 66 to reveal the underlying data.

For example, in this particular example, the first entity 18 first sends the multiple encrypted message decryption key 66 and the condition ID 54-N to the second entity 24-N. If the second entity 24-N cannot confirm the occurrence of the condition precedent identified by the condition ID 54-N, the first entity 18 does not send the multiple encrypted message decryption key 66 and the condition ID 54-1 to the second entity 24-1. If the second entity 24-N confirms the occurrence of the condition precedent identified by the condition ID 54-N, the second entity 24-N uses the private cryptographic key 51-N to decrypt the multiple encrypted message decryption key 66 to reveal the double encrypted message decryption key 50. The second entity 24-N transmits the double encrypted message decryption key 50 back to the first entity 18. The first entity 18 then sends the double encrypted message decryption key 50 and the condition ID 54-1 to the second entity 24-1. If the second entity 24-1 confirms the occurrence of the condition precedent identified by the condition ID 54-1, the second entity 24-1 uses the private cryptographic key 51-1 to decrypt the double encrypted message decryption key 50 to reveal the encrypted message decryption key 42 and sends the encrypted message decryption key 42 to the first entity 18. The first entity 18 then decrypts the encrypted message decryption key 42 using the private cryptographic key 45 to reveal the message decryption key 34. Using the message decryption key 34, the first entity 18 decrypts the encrypted message 36 to reveal the message 32, and uses the message 32 to take the requested action.

Figure 6:
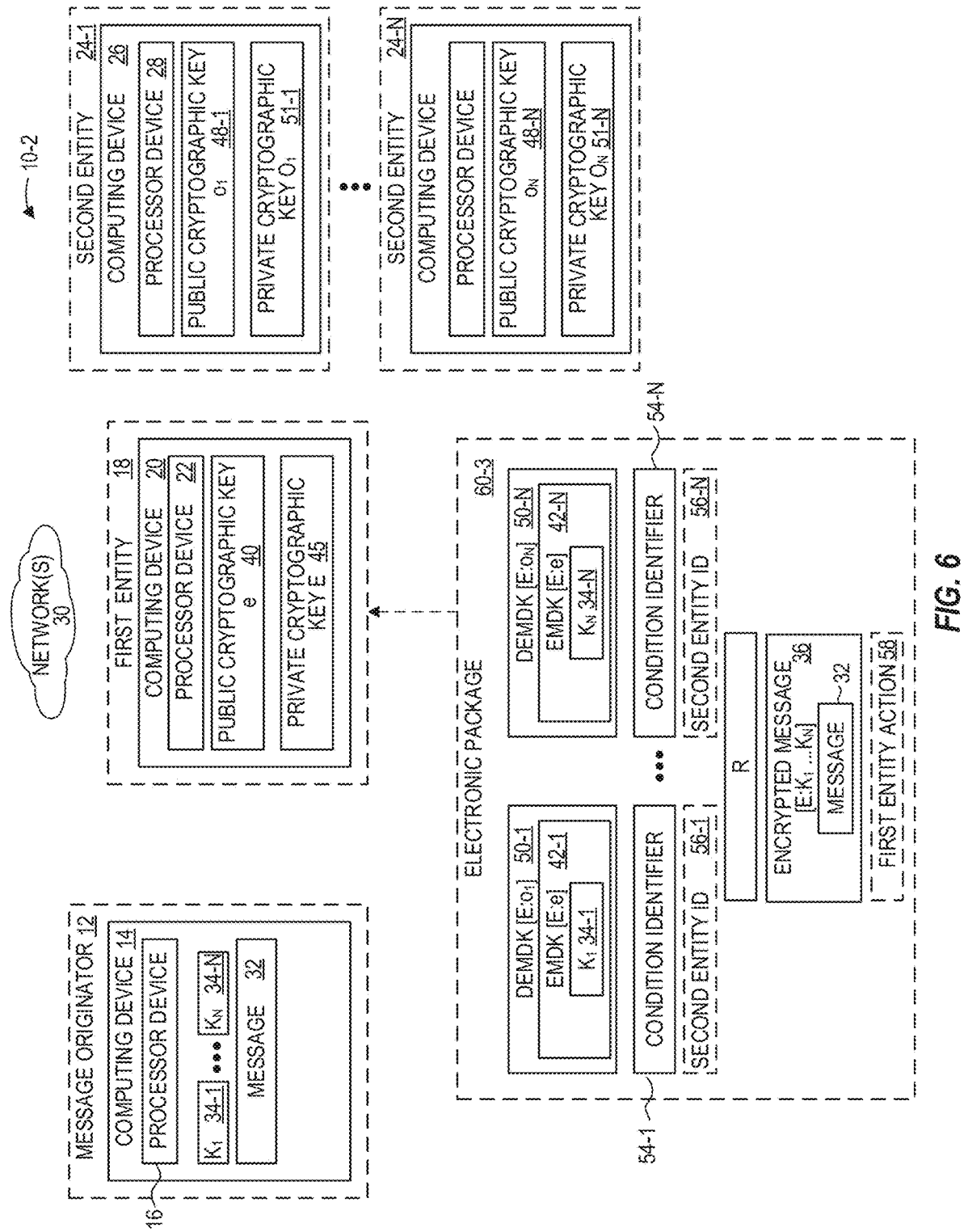
FIG. 6 is a block diagram of a computing system for message decryption dependent on third-party confirmation of a plurality of conditions precedent that are confirmable by a subset of a plurality of second entities according to one example.

FIG. 6 is a block diagram of a computing system 10-2 for message decryption dependent on third-party confirmation of a plurality of conditions precedent that are confirmable by a subset of a plurality of second entities, according to one example. The computing system 10-2 is substantially similar to and operates in substantially the same manner as the computing systems 10, 10-1 discussed with regard to FIGS. 1-5, except as otherwise discussed below.

In this example, the message originator 12 generates a plurality of symmetric cryptographic keys 34-1-34-N ("$K_1$-$K_N$"), and uses the symmetric cryptographic keys 34-1-34-N to encrypt the message 32 to form an encrypted message 36. Encryption of the message 32 using the symmetric cryptographic keys 34-1-34-N is performed according to a threshold cryptosystem that requires a specified subset of at least size R (where $1 \leq R \leq N$) of the symmetric cryptographic keys 34-1-34-N to decrypt the message 32. Some examples may provide that the threshold cryptosystem is the Shamir's Secret Sharing cryptosystem, as a non-limiting example.

Each of the symmetric cryptographic keys 34-1-34-N are then encrypted to form corresponding encrypted message decryption keys 42-1-42-N using the public cryptographic key 40 of the first entity 18. The message originator 12 encrypts the encrypted message decryption keys 42-1-42-N using public cryptographic keys 48-1-48-N of the plurality of second entities 24-1-24-N to form a plurality of corresponding double encrypted message decryption keys 50-1-50-N. The message originator 12 generates a plurality of condition IDs 54-1-54-N, each of which corresponds to a particular second entity 24-1-24-N, and each of which identifies a condition precedent that must be confirmed before the corresponding second entity 24-1-24-N will decrypt a corresponding double encrypted message decryption key 50-1-50-N. The condition IDs 54-1-54-N may also identify the particular second entity 24-1-24-N that is to confirm the condition precedent.

The message originator 12 sends an electronic package 60-3 comprising the encrypted message 36, the plurality of double encrypted message decryption keys 50-1-50-N, the plurality of condition IDs 54-1-54-N, the value of R, optionally, a plurality of second entity IDs 56 and the first entity action 58 to the first entity 18. As noted above, the encrypted message 36 can only be decrypted with a subset of at least size R (where $1 \leq R \leq N$) of the symmetric cryptographic keys 34-1-34-N used to encrypt the message 32. Accordingly, the designated action can be taken by the first entity 18 only after at least a number R of the plurality of conditions precedent identified by the condition IDs 54-1-54-N have been satisfied. Accordingly, the first entity 18 transmits the double encrypted message decryption key 50-1 and the condition ID 54-1 to the second entity 24-1. After receiving the double encrypted message decryption key 50-1, the second entity 24-1 confirms that the condition precedent identified by the condition ID 54-1 has been satisfied. If so, the second entity 24-1 decrypts the double encrypted message decryption key 50-1 using the private cryptographic key 51-1 to reveal the encrypted message decryption key 42-1, and transmits the encrypted message decryption key 42-1 back to the first entity 18. A similar sequence of operations may be carried out for one or more of the remaining condition IDs 54-1-54-N. Once a subset of at least size R of the conditions precedent have been confirmed by the second entities 24-1-24-N, and once the first entity 18 has received the subset of at least size R of the encrypted message decryption keys 42-1-42-N, the first entity 18 uses the decrypted symmetric cryptographic keys 34-1-34-N to decrypt the encrypted message 36 to reveal the message 32. The first entity 18 then takes the designated action using the message 32.

FIGS. 7A-7F are message flow diagrams that illustrate communication flows among the elements of the computing system 10-2 of FIG. 6 for message decryption dependent on third-party confirmation of a plurality of conditions precedent that are confirmable by a subset of a plurality of second entities 24, according to one example. Elements of FIG. 6 are referenced in describing FIGS. 7A-7F for the sake of clarity. As seen in FIGS. 7A-7F, each of the message originator 12, the first entity 18, and the second entities 24-1 and 24-N are represented by vertical lines, with communications between these elements illustrated by captioned arrows, and with operations performed by each element illustrated by captioned boxes.

Figure 7A:
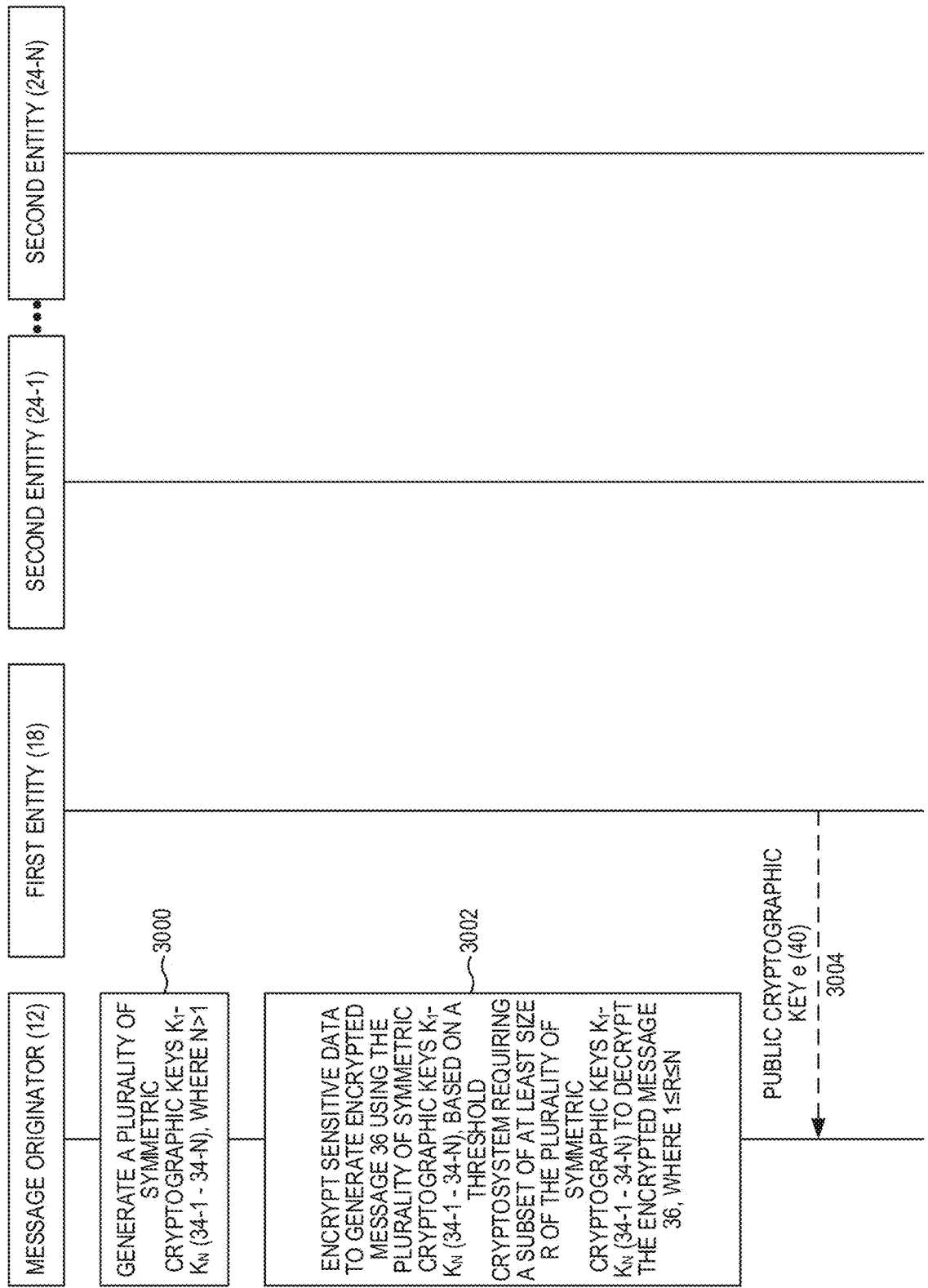
FIGS. 7A-7F are message flow diagrams illustrating communication flows among elements of the computing system of FIG. 6 for message decryption dependent on third-party confirmation of a plurality of conditions precedent that are confirmable by a subset of a plurality of second entities according to one example.

In the example of FIG. 7A, operations begin with the message originator 12 generating the plurality of symmetric cryptographic keys 34-1-34-N ("$K_1$-$K_N$") where N>1, as indicated by box 3000. The message originator 12 uses the symmetric cryptographic keys 34-1-34-N to encrypt the message 32 to form an encrypted message 36, as indicated by box 3002. Encryption of the message 32 using the symmetric cryptographic keys 34-1-34-N is performed according to a threshold cryptosystem that requires a specified subset of at least size R (where 1≤R≤N) of the symmetric cryptographic keys 34-1-34-N to decrypt the message 32. The message originator 12 in some examples may receive the public cryptographic key 40 from the first entity 18, as indicated by arrow 3004. Operations then continue in FIG. 7B.

Figure 7B:
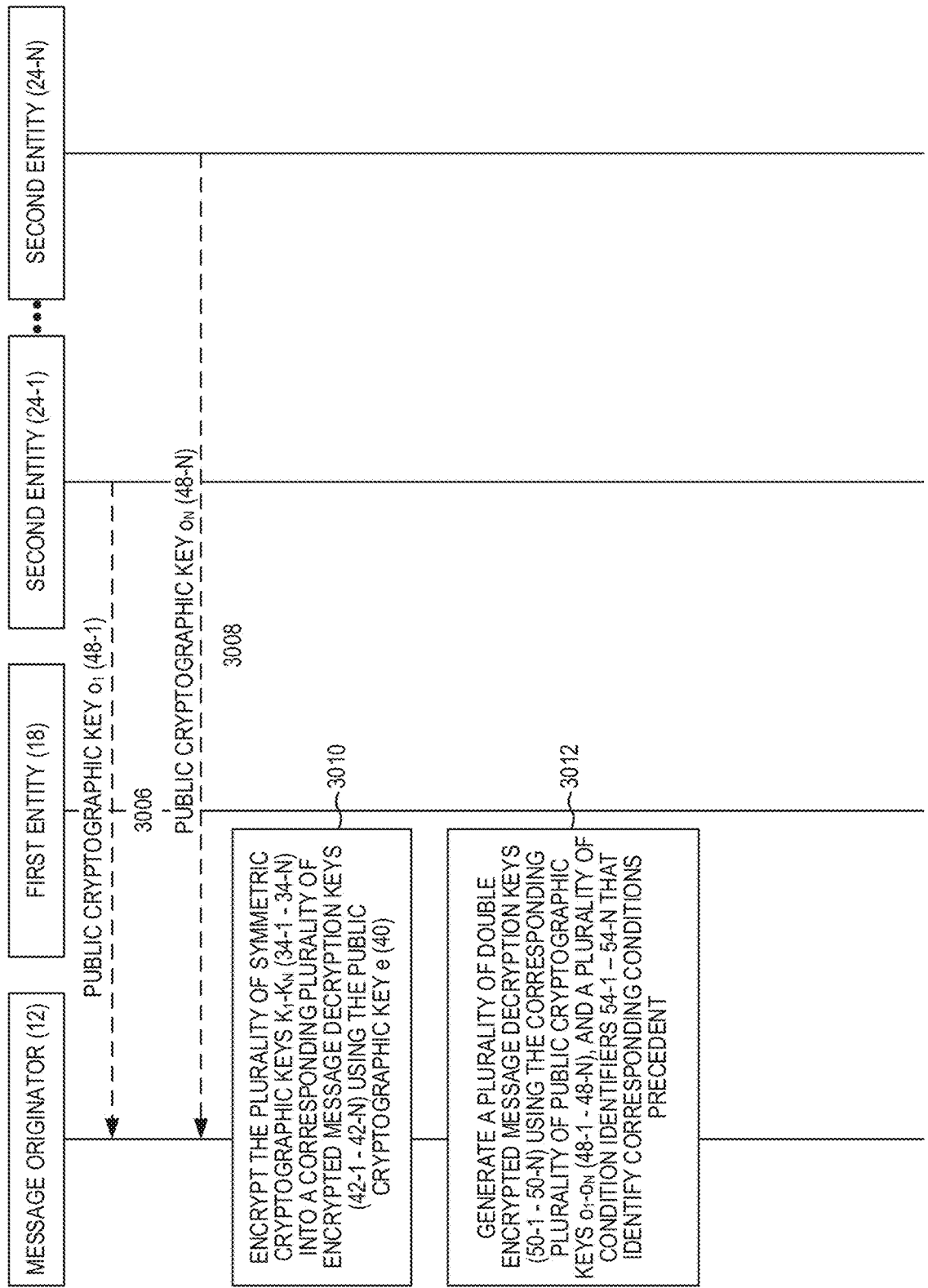

Referring now to FIG. 7B, the message originator 12 in some examples may also receive the public cryptographic key 48-1 from the second entity 24-1, as indicated by arrow 3006. Likewise, the message originator 12 may receive the public cryptographic key 48-N from the second entity 24-N, as indicated by arrow 3008. The message originator 12 then encrypts each of the symmetric cryptographic keys 34-1-34-N to form corresponding encrypted message decryption keys 42-1-42-N using the public cryptographic key 40 of the first entity 18, as indicated by block 3010. The message originator 12 encrypts the encrypted message decryption keys 42-1-42-N using public cryptographic keys 48-1-48-N of the plurality of second entities 24-1-24-N to form a plurality of corresponding double encrypted message decryption keys 50-1-50-N. The message originator 12 generates a plurality of condition IDs 54-1-54-N, each of which corresponds to a particular second entity 24-1-24-N, and each of which identifies a condition precedent that must be confirmed before the corresponding second entity 24-1-24-N will decrypt a corresponding double encrypted message decryption key 50-1-50-N, as indicated by block 3012. Operations then continue in FIG. 7C.

Figure 7C:
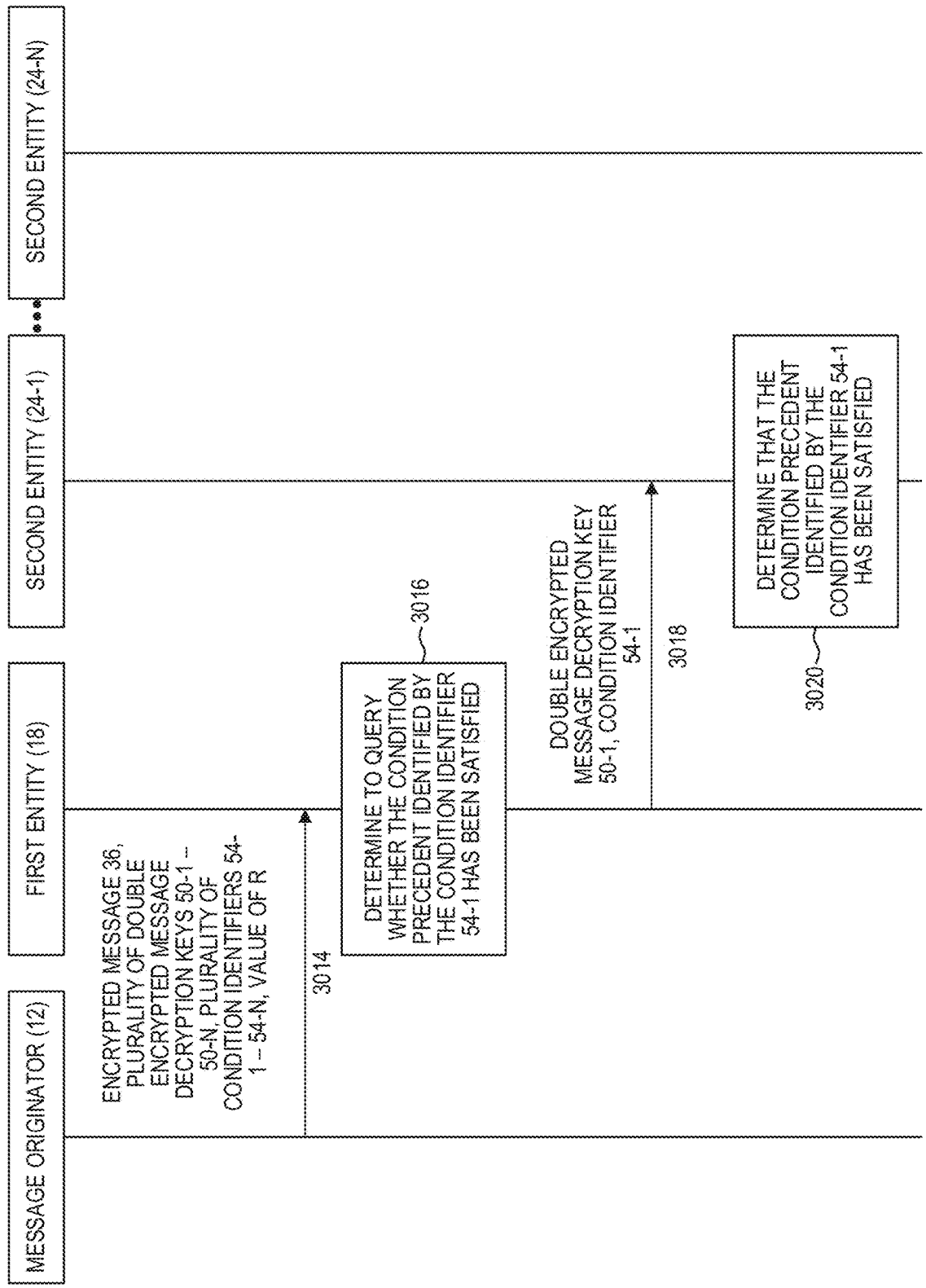

Turning to FIG. 7C, the message originator 12 sends the electronic package 60-3 comprising the encrypted message 36, the plurality of double encrypted message decryption keys 50-1-50-N, the plurality of condition IDs 54-1-54-N, the value of R, and, optionally, a plurality of second entity IDs 56 and the first entity action 58 to the first entity 18, as indicated by arrow 3014. In order to obtain a sufficient number R of encrypted message decryption keys 42-1-42-N, the first entity 18 communicates with a sufficient number of second entities 24-1-24-N until at least a subset of size R of the second entities 24-1-24-N have confirmed the occurrence of a corresponding condition precedent, and have provided to the first entity 18 at least a subset of size R of encrypted message decryption keys 42-1-42-N.

Accordingly, the first entity 18 determines that it is time to query whether the condition precedent identified by the condition ID 54-1 can be confirmed by the second entity 24-1, as indicated by block 3016. As discussed above, this determination can be made, by way of non-limiting example, based on some event or via periodic polling of the second entity 24-1. The first entity 18 transmits the double encrypted message decryption key 50-1 and the condition ID 54-1 to the second entity 24-1, as indicated by arrow 3018.

In the example discussed in FIGS. 7A-7F, it will be assumed, for purposes of illustration, that only the symmetric message decryption keys 34-1 and 34-N are required to decrypt the encrypted message 36. However, it is to be understood that the operations described herein may be performed by the first entity 18 in relation to any number R of any number of symmetric message decryption keys 34-1-34-N. The second entity 24-1 determines that the condition precedent identified by the condition ID 54-1 has been satisfied, as indicated by block 3020. Operations then continue in FIG. 7D.

Figure 7D:
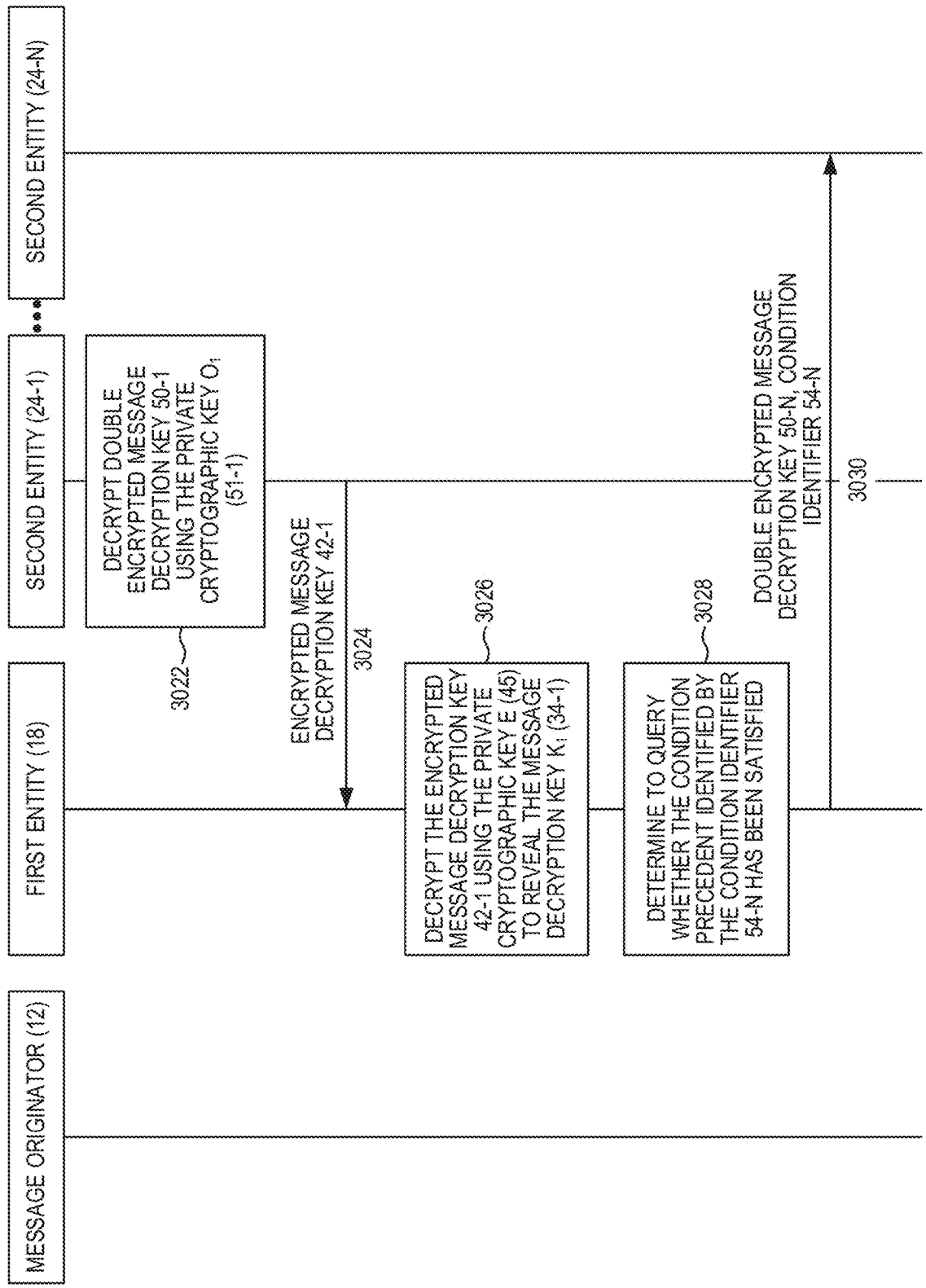
Figure 7E:
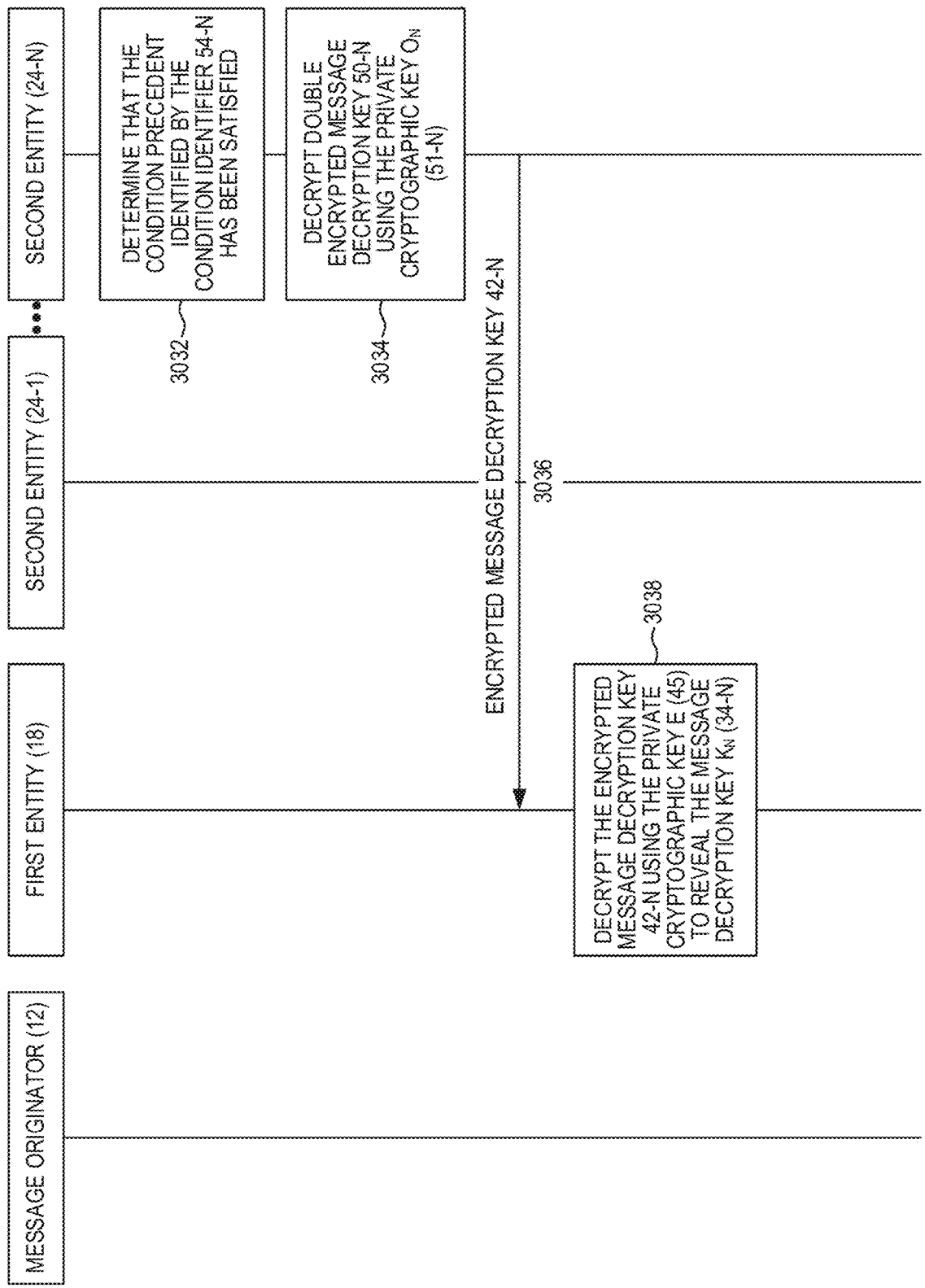

In FIG. 7D, the second entity 24-1 decrypts the double encrypted message decryption key 50-1 using the private cryptographic key 51-1, as indicated by block 3022 to reveal the encrypted message decryption key 42-1. The second entity 24-1 then transmits the encrypted message decryption key 42-1 back to the first entity 18, as indicated by arrow 3024. The first entity 18 decrypts the encrypted message decryption key 42-1 using the private cryptographic key 45 to reveal the symmetric message decryption key 34-1 ("$K_1$"), as indicated by box 3026.

The contract executor also performs a similar series of operations with respect to the second entity 24-N. Accordingly, the first entity 18 determines that it is time to query whether the condition precedent identified by the condition ID 54-N can be confirmed by the second entity 24-N, as indicated by block 3028. The first entity 18 transmits the double encrypted message decryption key 50-N and the condition ID 54-N to the second entity 24-N, as indicated by arrow 3030. Operations then continue in FIG. 7E.

The second entity 24-N determines that the condition precedent identified by the condition ID 54-N has been satisfied, as indicated by block 3032. The second entity 24-N decrypts the double encrypted message decryption key 50-N using the private cryptographic key 51-N, as indicated by block 3034 to reveal the encrypted message decryption key 42-N. The second entity 24-N then transmits the encrypted message decryption key 42-N back to the first entity 18, as indicated by arrow 3036. The first entity 18 decrypts the encrypted message decryption key 42-N using the private cryptographic key 45 to reveal the symmetric message decryption key 34-N, as indicated by box 3038. Operations then continue in FIG. 7F.

Figure 7F:
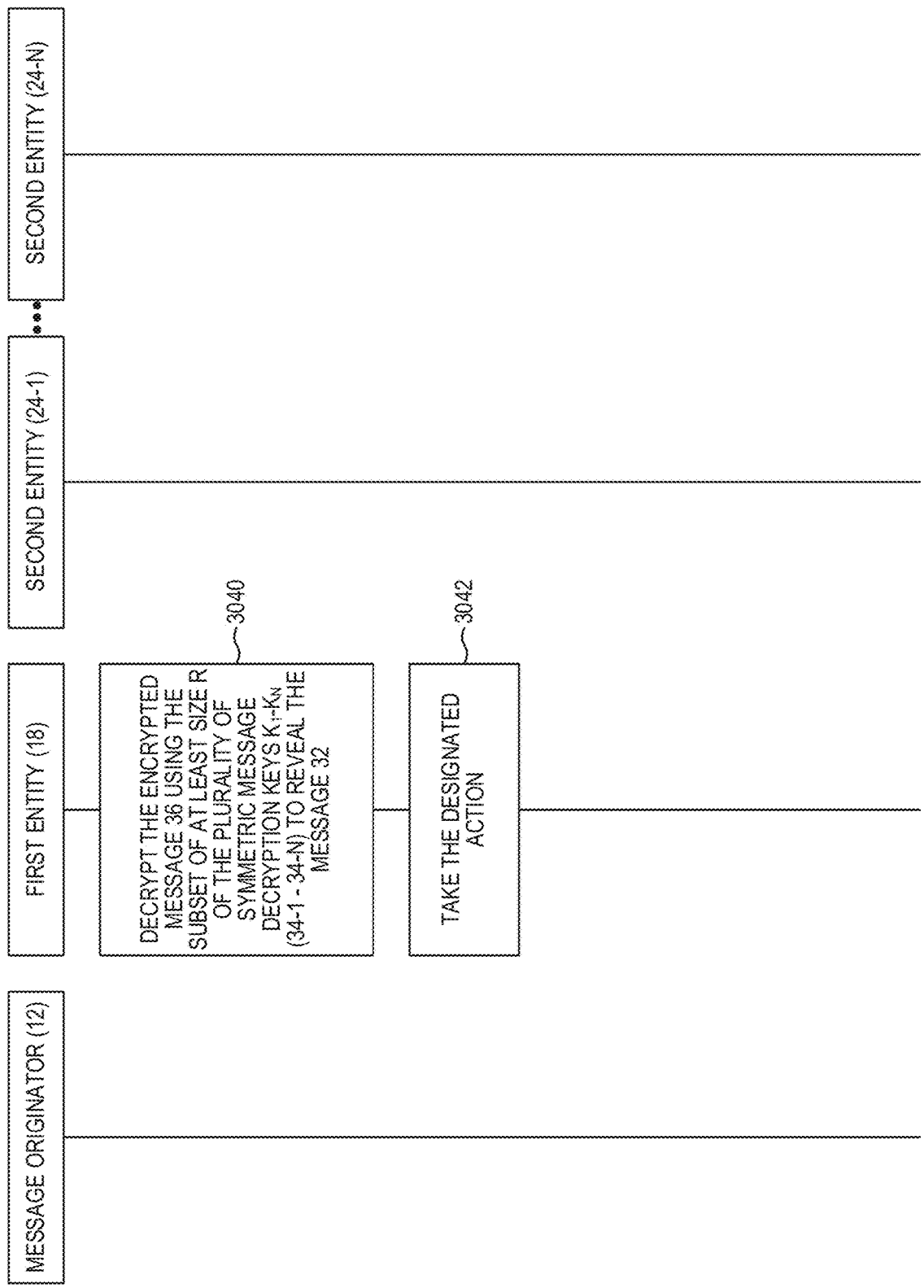

Turning now to FIG. 7F, once the first entity 18 has received and decrypted a subset of at least size R of the plurality of symmetric message decryption keys 34-1-34-N, the first entity 18 decrypts the encrypted message 36 using the subset of at least size R of the plurality of symmetric message decryption keys 34-1-34-N to reveal the message 32, as indicated by box 3040. The first entity 18 then takes the designated action using the message 32, as indicated by box 3042.

Figure 8:
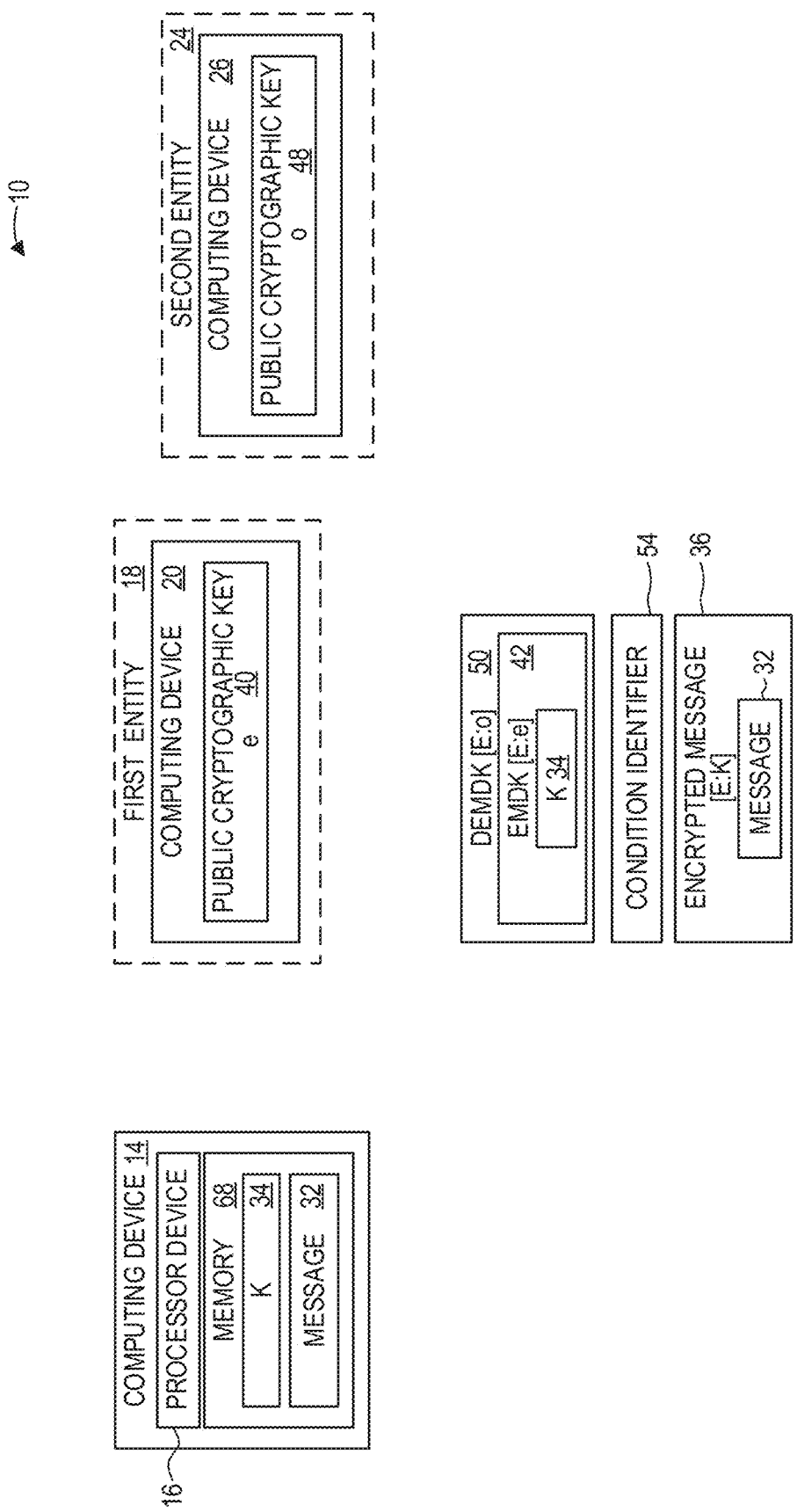
FIG. 8 is a simplified block diagram of the computing system illustrated in FIG. 1.

FIG. 8 is a simplified block diagram of the computing system 10 illustrated in FIG. 1 according to one example. The computing system 10 includes the computing device 14 which includes a memory 68 and the processor device 16 which is coupled to the memory 68. In this example, the key 34 is a symmetric key and thus functions as both an encryption key and as a decryption key. The processor device 16 is to encrypt the message 32 with the encryption key 34 to form the encrypted message 36. The processor device 16 is further to encrypt the message decryption key 34 that is configured to decrypt the encrypted message 36 with the public cryptographic key 40 of the first entity 18 to which the message 32 is to be disclosed upon occurrence of a condition precedent to form the encrypted message decryption key 42. The processor device 16 is further to encrypt the encrypted message decryption key 42 with the public cryptographic key 48 of the second entity 24 configured to confirm the occurrence of the condition precedent to form the double encrypted message decryption key 50. The processor device 16 is further to generate the condition ID 54 that identifies the condition precedent, send the encrypted message 36, the double encrypted message decryption key 50, and the condition ID 54 to the first entity 18.

Figure 9:
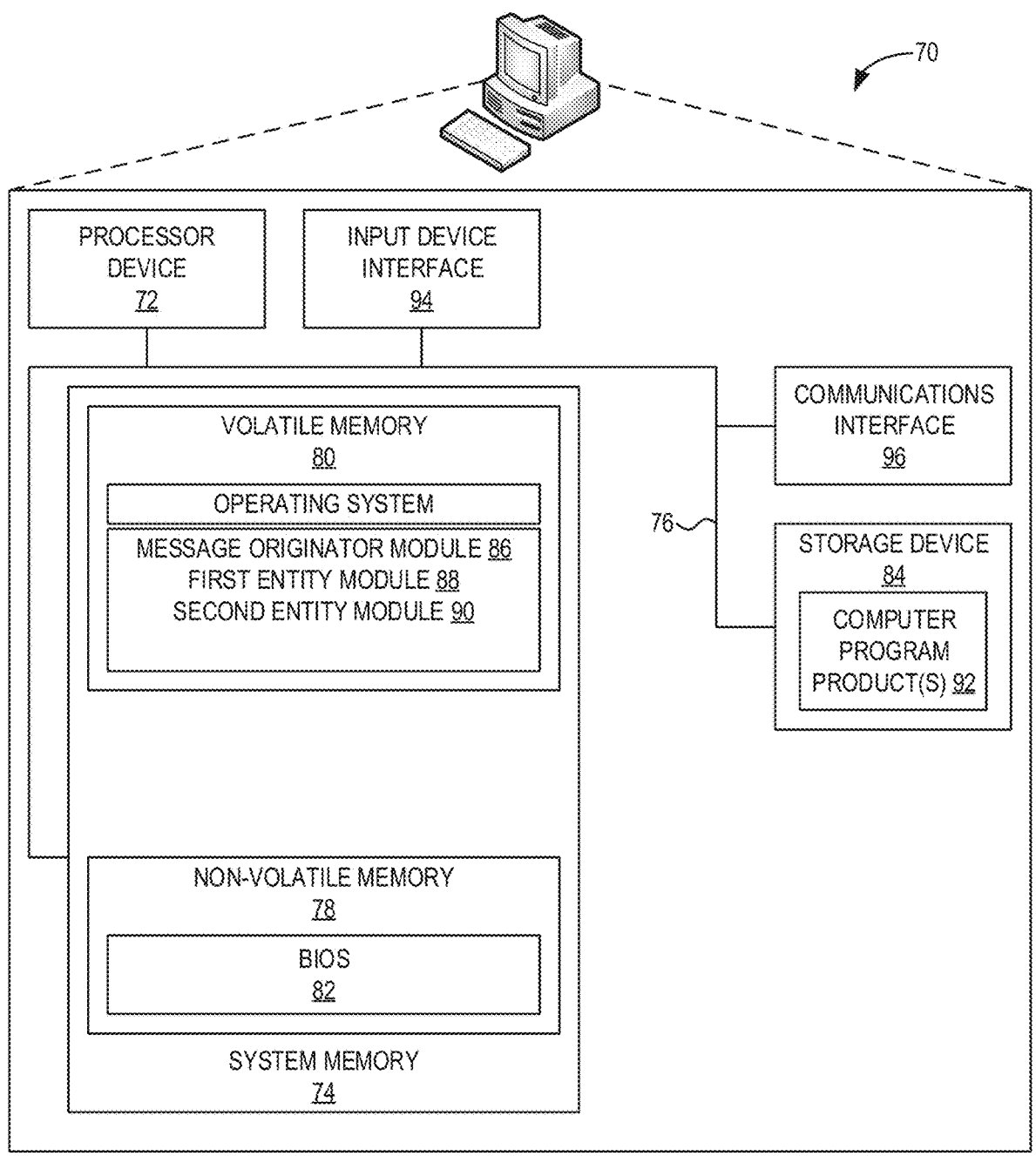
FIG. 9 is a block diagram of a computing device suitable for implementing examples disclosed herein.

FIG. 9 is a block diagram of a processor-based computing device 70 ("computing device 70"), such as the computing device 14, the computing device 20, or the computing device 26, suitable for implementing examples according to one example. The computing device 70 may comprise any computing or electronic device capable of including firmware, hardware, and/or executing software instructions to implement the functionality described herein, such as a computer server, a desktop computing device, a laptop computing device, or the like. The computing device 70 includes a processor device 72, a system memory 74, and a system bus 76. The system bus 76 provides an interface for system components including, but not limited to, the system memory 74 and the processor device 72. The processor device 72 can be any commercially available or proprietary processor.

The system bus 76 may be any of several types of bus structures that may further interconnect to a memory bus (with or without a memory controller), a peripheral bus, and/or a local bus using any of a variety of commercially available bus architectures. The system memory 74 may include non-volatile memory 78 (e.g., read-only memory (ROM), erasable programmable ROM (EPROM), electrically EPROM (EEPROM), etc.), and volatile memory 80 (e.g., RAM). A basic input/output system (BIOS) 82 may be stored in the non-volatile memory 78 and can include the basic routines that help to transfer information among elements within the computing device 70. The volatile memory 80 may also include a high-speed RAM, such as static RAM, for caching data.

The computing device 70 may further include or be coupled to a non-transitory computer-readable storage medium such as a storage device 84, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 84 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 84 and in the volatile memory 80, including an operating system and one or more program modules which may implement the functionality described herein in whole or in part. For example, a message originator module 86 may comprise programming instructions that implement the functionality described herein with regard to the message originator 12. A first entity module 88 may comprise programming instructions that implement the functionality described herein with regard to the first entity 18. A second entity module 90 may comprise programming instructions that implement the functionality described herein with regard to the second entity 24. All or a portion of the examples may be implemented as a computer program product 92 stored on a transitory or non-transitory computer-usable or computer-readable storage medium, such as the storage device 84, which includes complex programming instructions, such as complex computer-readable program code, to cause the processor device 72 to carry out the steps described herein. Thus, the computer-readable program code can comprise software instructions for implementing the functionality of the examples described herein when executed on the processor device 72. The processor device 72 may serve as a controller, or control system, for the computing device 70 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 72 through an input device interface 94 that is coupled to the system bus 76 but can be connected by other interfaces, such as a parallel port, an Institute of Electrical and Electronic Engineers (IEEE) 1394 serial port, a Universal Serial Bus (USB) port, an IR interface, and the like. The computing device 70 may also include a communications interface 96 suitable for communicating with the network(s) 30 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
encrypting, by a computing device comprising a processor device, a message with a message encryption key to form an encrypted message;
encrypting a message decryption key that is configured to decrypt the encrypted message with a key of a first entity to which the message is to be disclosed upon occurrence of a condition precedent to form an encrypted message decryption key;
encrypting the encrypted message decryption key with a key of a second entity configured to confirm the occurrence of the condition precedent to form a double encrypted message decryption key;
generating a condition identifier that identifies the condition precedent; and
sending the encrypted message, the double encrypted message decryption key, and the condition identifier to the first entity prior to the occurrence of the condition precedent.

2. The method of claim 1 further comprising sending a second entity identifier that identifies the second entity to the first entity.

3. The method of claim 1 wherein:
encrypting the message decryption key configured to decrypt the encrypted message with the key of the first entity comprises encrypting the message decryption key configured to decrypt the encrypted message with the key of the first entity to which the message is to be disclosed upon occurrence of a plurality of conditions precedent, to form the encrypted message decryption key;
generating the condition identifier that identifies the condition precedent further comprises generating a plurality of condition identifiers, each condition identifier identifying a different condition precedent of the plurality of conditions precedent and each different condition precedent being confirmable by the second entity; and sending the encrypted message, the double encrypted message decryption key, and the condition identifier to the first entity comprises sending the encrypted message, the double encrypted message decryption key, and the plurality of condition identifiers to the first entity.

4. The method of claim 1 wherein the key of the first entity comprises a public cryptographic key of the first entity, and wherein the key of the second entity comprises a public cryptographic key of the second entity, and wherein the message decryption key is a symmetric key and is a same key as the message encryption key.

5. The method of claim 1 wherein:
encrypting the message decryption key configured to decrypt the encrypted message with the key of the first entity comprises encrypting the message decryption key configured to decrypt the encrypted message with the key of the first entity, to which the message is to be disclosed upon occurrence of a plurality of conditions precedent, to form the encrypted message decryption key;
encrypting the encrypted message decryption key with the key of the second entity configured to confirm the occurrence of the condition precedent to form the double encrypted message decryption key, comprises iteratively encrypting the encrypted message decryption key with the key of each second entity of a plurality of second entities configured to confirm the occurrence of a corresponding condition precedent of the plurality of conditions precedent to form a multiple encrypted message decryption key;
generating the condition identifier that identifies the condition precedent further comprises generating a plurality of condition identifiers, each condition identifier identifying a different condition precedent of the plurality of conditions precedent and each different condition precedent being confirmable by a particular second entity of the plurality of second entities; and
sending the encrypted message, the double encrypted message decryption key, and the condition identifier to the first entity comprises sending the encrypted message, the multiple encrypted message decryption key, and the plurality of condition identifiers to the first entity.

6. The method of claim 5 wherein each condition precedent of the plurality of conditions precedent is a same condition precedent.

7. The method of claim 5 wherein each condition precedent of the plurality of conditions precedent is different from each other condition precedent.

8. The method of claim 5 further comprising sending a plurality of second entity identifiers to the first entity, each second entity identifier identifying one of the second entities.

9. The method of claim 1 further comprising generating a plurality of symmetric keys $K_1$-$K_N$, where N>1; and wherein:
encrypting the message with the message encryption key to form the encrypted message comprises encrypting the message using the plurality of symmetric keys $K_1$-$K_N$ to form the encrypted message, the symmetric keys $K_1$-$K_N$ based on a threshold cryptosystem requiring a subset of at least size R of the plurality of symmetric keys $K_1$-$K_N$ to decrypt the encrypted message, where $1 \leq R \leq N$;
encrypting the message decryption key configured to decrypt the encrypted message with the key of the first entity to which the message is to be disclosed upon occurrence of the condition precedent to form the encrypted message decryption key comprises encrypting the plurality of symmetric keys $K_1$-$K_N$ into a plurality of encrypted message decryption keys using the key of the first entity to which the message is to be disclosed upon occurrence of one or more conditions precedent;
encrypting the encrypted message decryption key with the key of the second entity configured to confirm the occurrence of the condition precedent to form the double encrypted message decryption key comprises encrypting each encrypted message decryption key with a key of a second entity of a plurality of second entities configured to confirm the occurrence of the one or more conditions precedent to form a plurality of double encrypted message decryption keys;
generating the condition identifier that identifies the condition precedent comprises generating a plurality of condition identifiers, each condition identifier identifying a different condition precedent of a plurality of conditions precedent and each different condition precedent being confirmable by a particular second entity of the plurality of second entities; and
sending the encrypted message, the double encrypted message decryption key, and the condition identifier to the first entity comprises sending the encrypted message, the plurality of double encrypted message decryption keys, the plurality of condition identifiers, and R to the first entity.

10. The method of claim 1 further comprising:
receiving, by the first entity, the encrypted message, the double encrypted message decryption key, and the condition identifier;
sending the double encrypted message decryption key to the second entity;
receiving, from the second entity, the encrypted message decryption key;
decrypting, by the first entity, the encrypted message decryption key with a key of the first entity to obtain the message decryption key; and
decrypting the encrypted message with the message decryption key to obtain the message.

11. A computing device, comprising:
a memory;
a processor device coupled to the memory to:
encrypt a message with a message encryption key to form an encrypted message;
encrypt a message decryption key that is configured to decrypt the encrypted message with a key of a first entity to which the message is to be disclosed upon occurrence of a condition precedent to form an encrypted message decryption key;
encrypt the encrypted message decryption key with a key of a second entity configured to confirm the occurrence of the condition precedent to form a double encrypted message decryption key;
generate a condition identifier that identifies the condition precedent; and
send the encrypted message, the double encrypted message decryption key, and the condition identifier to the first entity prior to the occurrence of the condition precedent.

12. The computing device of claim 11 wherein to:
encrypt the message decryption key configured to decrypt the encrypted message with the key of the first entity, the processor device is further to encrypt the message decryption key configured to decrypt the encrypted message with the key of the first entity to which the message is to be disclosed upon occurrence of a plurality of conditions precedent, to form the encrypted message decryption key;

generate the condition identifier that identifies the condition precedent, the processor device is further to generate a plurality of condition identifiers, each condition identifier identifying a different condition precedent of the plurality of conditions precedent and each different condition precedent being confirmable by the second entity; and send the encrypted message, the double encrypted message decryption key, and the condition identifier to the first entity, the processor device is further to send the encrypted message, the double encrypted message decryption key, and the plurality of condition identifiers to the first entity.

13. The computing device of claim 11 wherein the key of the first entity comprises a public cryptographic key of the first entity, and wherein the key of the second entity comprises a public cryptographic key of the second entity, and wherein the message decryption key is a symmetric key and is a same key as the message encryption key.

14. The computing device of claim 11 wherein to:

encrypt the message decryption key configured to decrypt the encrypted message with the key of the first entity, the processor device is further to encrypt the message decryption key configured to decrypt the encrypted message with the key of the first entity to which the message is to be disclosed upon occurrence of a plurality of conditions precedent, to form the encrypted message decryption key;

encrypt the encrypted message decryption key with the key of the second entity configured to confirm the occurrence of the condition precedent to form the double encrypted message decryption key, the processor device is further to iteratively encrypt the encrypted message decryption key with the key of each second entity of a plurality of second entities configured to confirm the occurrence of a corresponding condition precedent of the plurality of conditions precedent to form a multiple encrypted message decryption key;

generate the condition identifier that identifies the condition precedent, the processor device is further to generate a plurality of condition identifiers, each condition identifier identifying a different condition precedent of the plurality of conditions precedent and each different condition precedent being confirmable by a particular second entity of the plurality of second entities; and send the encrypted message, the double encrypted message decryption key, and the condition identifier to the first entity, the processor device is further to send the encrypted message, the multiple encrypted message decryption key, and the plurality of condition identifiers to the first entity.

15. The computing device of claim 11 wherein the processor device is further to generate a plurality of symmetric keys $K_1$-$K_N$, where N>1; and wherein to:

encrypt the message with the message encryption key to form the encrypted message, the processor device is further to encrypt the message using the plurality of symmetric keys $K_1$-$K_N$ to form the encrypted message, the symmetric keys $K_1$-$K_N$ based on a threshold cryptosystem requiring a subset of at least size R of the plurality of symmetric keys $K_1$-$K_N$ to decrypt the encrypted message, where 1≤R≤N;

encrypt the message decryption key configured to decrypt the encrypted message with the key of the first entity to which the message is to be disclosed upon occurrence of the condition precedent to form the encrypted message decryption key, the processor device is further to encrypt the plurality of symmetric keys $K_1$-$K_N$ into a plurality of encrypted message decryption keys using the key of the first entity to which the message is to be disclosed upon occurrence of one or more conditions precedent;

encrypt the encrypted message decryption key with the key of the second entity configured to confirm the occurrence of the condition precedent to form the double encrypted message decryption key, the processor device is further to encrypt each encrypted message decryption key with a key of a second entity of a plurality of second entities configured to confirm the occurrence of the one or more conditions precedent to form a plurality of double encrypted message decryption keys;

generate the condition identifier that identifies the condition precedent, the processor device is further to generate a plurality of condition identifiers, each condition identifier identifying a different condition precedent of a plurality of conditions precedent and each different condition precedent being confirmable by a particular second entity of the plurality of second entities; and send the encrypted message, the double encrypted message decryption key, and the condition identifier to the first entity, the processor device is further to send the encrypted message, the plurality of double encrypted message decryption keys, the plurality of condition identifiers, and R to the first entity.

16. A computer program product stored on a non-transitory computer-readable storage medium and including instructions to cause a processor device to:

encrypt a message with a message encryption key to form an encrypted message;

encrypt a message decryption key that is configured to decrypt the encrypted message with a key of a first entity to which the message is to be disclosed upon occurrence of a condition precedent to form an encrypted message decryption key;

encrypt the encrypted message decryption key with a key of a second entity configured to confirm the occurrence of the condition precedent to form a double encrypted message decryption key;

generate a condition identifier that identifies the condition precedent; and send the encrypted message, the double encrypted message decryption key, and the condition identifier to the first entity prior to the occurrence of the condition precedent.

17. The computer program product of claim 16 wherein to:

encrypt the message decryption key configured to decrypt the encrypted message with the key of the first entity, the instructions further cause the processor device to encrypt the message decryption key configured to decrypt the encrypted message with the key of the first entity to which the message is to be disclosed upon occurrence of a plurality of conditions precedent, to form the encrypted message decryption key;

generate the condition identifier that identifies the condition precedent, the instructions further cause the processor device to generate a plurality of condition identifiers, each condition identifier identifying a different condition precedent of the plurality of conditions precedent and each different condition precedent being confirmable by the second entity; and send the encrypted message, the double encrypted message decryption key, and the condition identifier to the first entity, the instructions further cause the processor device to send the encrypted message, the double encrypted message decryption key, and the plurality of condition identifiers to the first entity.

18. The computer program product of claim 16 wherein the key of the first entity comprises a public cryptographic key of the first entity, and wherein the key of the second entity comprises a public cryptographic key of the second entity, and wherein the message decryption key is a symmetric key and is a same key as the message encryption key.

19. The computer program product of claim 16 wherein to:

encrypt the message decryption key configured to decrypt the encrypted message with the key of the first entity, the instructions further cause the processor device to encrypt the message decryption key configured to decrypt the encrypted message with the key of the first entity to which the message is to be disclosed upon occurrence of a plurality of conditions precedent, to form the encrypted message decryption key;

encrypt the encrypted message decryption key with the key of the second entity configured to confirm the occurrence of the condition precedent to form the double encrypted message decryption key, the instructions further cause the processor device to iteratively encrypt the encrypted message decryption key with the key of each second entity of a plurality of second entities configured to confirm the occurrence of a corresponding condition precedent of the plurality of conditions precedent to form a multiple encrypted message decryption key;

generate the condition identifier that identifies the condition precedent, the instructions further cause the processor device to generate a plurality of condition identifiers, each condition identifier identifying a different condition precedent of the plurality of conditions precedent and each different condition precedent being confirmable by a particular second entity of the plurality of second entities; and send the encrypted message, the double encrypted message decryption key, and the condition identifier to the first entity, the instructions further cause the processor device to send the encrypted message, the multiple encrypted message decryption key, and the plurality of condition identifiers to the first entity.

20. The computer program product of claim 16 wherein the instructions further cause the processor device to generate a plurality of symmetric keys $K_1$-$K_N$, where N>1; and wherein to:

encrypt the message with the message encryption key to form the encrypted message, the instructions further cause the processor device to encrypt the message using the plurality of symmetric keys $K_1$-$K_N$ to form the encrypted message, the symmetric keys $K_1$-$K_N$ based on a threshold cryptosystem requiring a subset of at least size R of the plurality of symmetric keys $K_1$-$K_N$ to decrypt the encrypted message, where $1 \leq R \leq N$;

encrypt the message decryption key configured to decrypt the encrypted message with the key of the first entity to which the message is to be disclosed upon occurrence of the condition precedent to form the encrypted message decryption key, the instructions further cause the processor device to encrypt the plurality of symmetric keys $K_1$-$K_N$ into a plurality of encrypted message decryption keys using the key of the first entity to which the message is to be disclosed upon occurrence of one or more conditions precedent;

encrypt the encrypted message decryption key with the key of the second entity configured to confirm the occurrence of the condition precedent to form the double encrypted message decryption key, the instructions further cause the processor device to encrypt each encrypted message decryption key with a key of a second entity of a plurality of second entities configured to confirm the occurrence of the one or more conditions precedent to form a plurality of double encrypted message decryption keys;

generate the condition identifier that identifies the condition precedent, the instructions further cause the processor device to generate a plurality of condition identifiers, each condition identifier identifying a different condition precedent of a plurality of conditions precedent and each different condition precedent being confirmable by a particular second entity of the plurality of second entities; and send the encrypted message, the double encrypted message decryption key, and the condition identifier to the first entity, the instructions further cause the processor device to send the encrypted message, the plurality of double encrypted message decryption keys, the plurality of condition identifiers, and R to the first entity.

* * * * *